(12) United States Patent
Nakano et al.

(10) Patent No.: US 7,706,292 B2
(45) Date of Patent: Apr. 27, 2010

(54) NETWORK SYSTEM, NETWORK APPARATUS, ROUTE CHANGE METHOD, AND PROGRAM STORAGE MEDIUM STORING PROGRAM THEREOF

(75) Inventors: Masayoshi Nakano, Fukuoka (JP); Kazuhiro Nakashima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 11/942,382

(22) Filed: Nov. 19, 2007

(65) Prior Publication Data
US 2008/0117829 A1 May 22, 2008

(30) Foreign Application Priority Data
Nov. 20, 2006 (JP) ............... 2006-312890

(51) Int. Cl.
*H04J 1/16* (2006.01)
(52) U.S. Cl. ...................... 370/247; 370/251
(58) Field of Classification Search .......... 370/251, 370/247, 242, 252, 253, 232, 237, 474, 473, 370/401, 389, 471, 395.53, 395.42; 709/207, 709/240, 249
See application file for complete search history.

(56) References Cited

U.S. PATENT DOCUMENTS 6,034,948 A * 3/2000 Nakamura et al. .......... 370/246

7,142,512 B1 * 11/2006 Kobayashi et al. .......... 370/232

FOREIGN PATENT DOCUMENTS

| JP | 9-191322 A | 7/1997 |
| JP | 2002-44125 A | 2/2002 |

* cited by examiner

*Primary Examiner*—Chi H Pham
*Assistant Examiner*—Alexander Boakye
(74) *Attorney, Agent, or Firm*—Westman, Hattori, Daniels & Adrian, LLP

(57) ABSTRACT

A test packet generator of an entry device generates a delay test packet including priority information. A test packet transmitter of the entry device transmits the delay test packet to an exit device through a route corresponding to the priority information. A test packet receiver of the exit device receives the delay test packet. A reply packet transmitter of the exit device returns a reply-delay test packet toward the entry device through the same route in the counter direction. A reply packet receiver of the entry device receives the reply-delay test packet. A delay calculator of the entry device calculates a delay time on the basis of the time of transmitting the delay test packet and the time of receiving the reply-delay test packet. A route changer of the entry device changes routing appropriately on the basis of the delay time.

13 Claims, 35 Drawing Sheets

FIG. 3

| APPARATUS | DESTINATION | PORT |
|---|---|---|
| APPARATUS A | APPARATUS B | P1 of APPARATUS B |
| | APPARATUS C | P1 of APPARATUS B |
| | APPARATUS D | P1 of APPARATUS B |
| | APPARATUS E | P1 of APPARATUS E |
| | APPARATUS F | P1 of APPARATUS E |
| APPARATUS B | APPARATUS A | P1 of APPARATUS A |
| | APPARATUS C | P1 of APPARATUS C |
| | APPARATUS D | P1 of APPARATUS C |
| | APPARATUS E | P1 of APPARATUS A |
| | APPARATUS F | P1 of APPARATUS C |
| APPARATUS C | APPARATUS A | P2 of APPARATUS B |
| | APPARATUS B | P2 of APPARATUS B |
| | APPARATUS D | P1 of APPARATUS D |
| | APPARATUS E | P2 of APPARATUS D |
| | APPARATUS F | P2 of APPARATUS D |

| DATA | DESTINATION | PORT |
|---|---|---|
| IMAGE DATA | Y | P1 |
| OTHER DATA | Y | P2 |

FIG. 4A

| PORT | DATA | APPARATUS A | APPARATUS B | APPARATUS C | APPARATUS E | APPARATUS F |
|---|---|---|---|---|---|---|
| P1 | IMAGE DATA | 80% | - | - | - | - |
| P1 | OTHER DATA | 20% | - | - | - | - |
| P2 | IMAGE DATA | 20% | 80% | 80% | 20% | 20% |
| P2 | OTHER DATA | 80% | 20% | 20% | 80% | 80% |

FIG. 4B

| DATA | DESTINATION | PORT |
|---|---|---|
| IMAGE DATA | Y | P2 |
| OTHER DATA | Y | P2 |

FIG. 4C

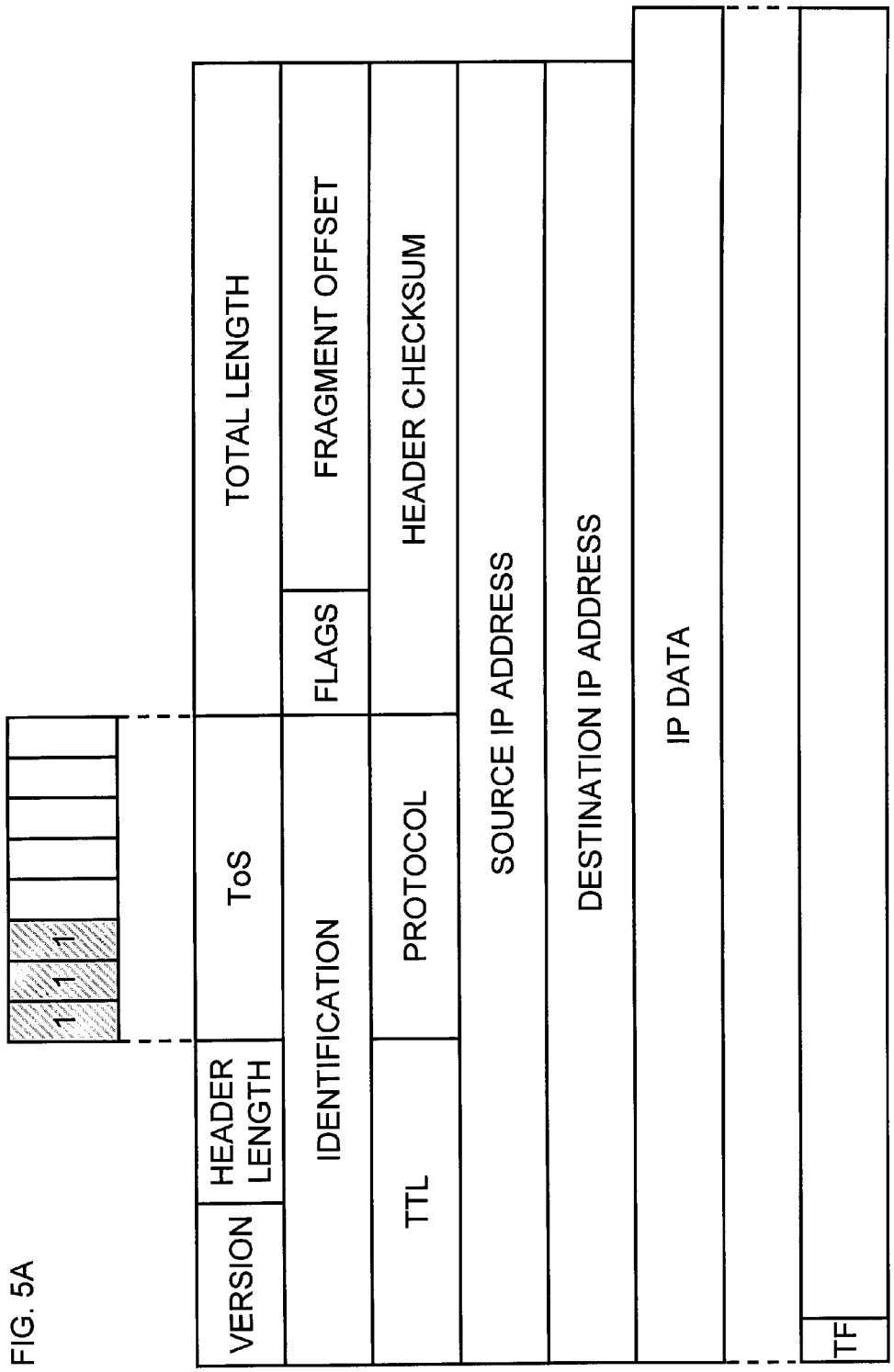

| DELAY TEST PACKET No. | ROUTE | PRIORITY | TRANSMISSION CYCLE TIMER | TRANSMISSION TIME-OUT TIMER |
|---|---|---|---|---|
| 1 | A→B→C→D | HIGH | 15 [s] | 30 [s] |
| 2 | A→B→C→D | LOW | 40 [s] | 80 [s] |
| 3 | A→E→F→D | HIGH | 20 [s] | 40 [s] |
| 4 | A→E→F→D | LOW | 30 [s] | 60 [s] |

FIG. 5B

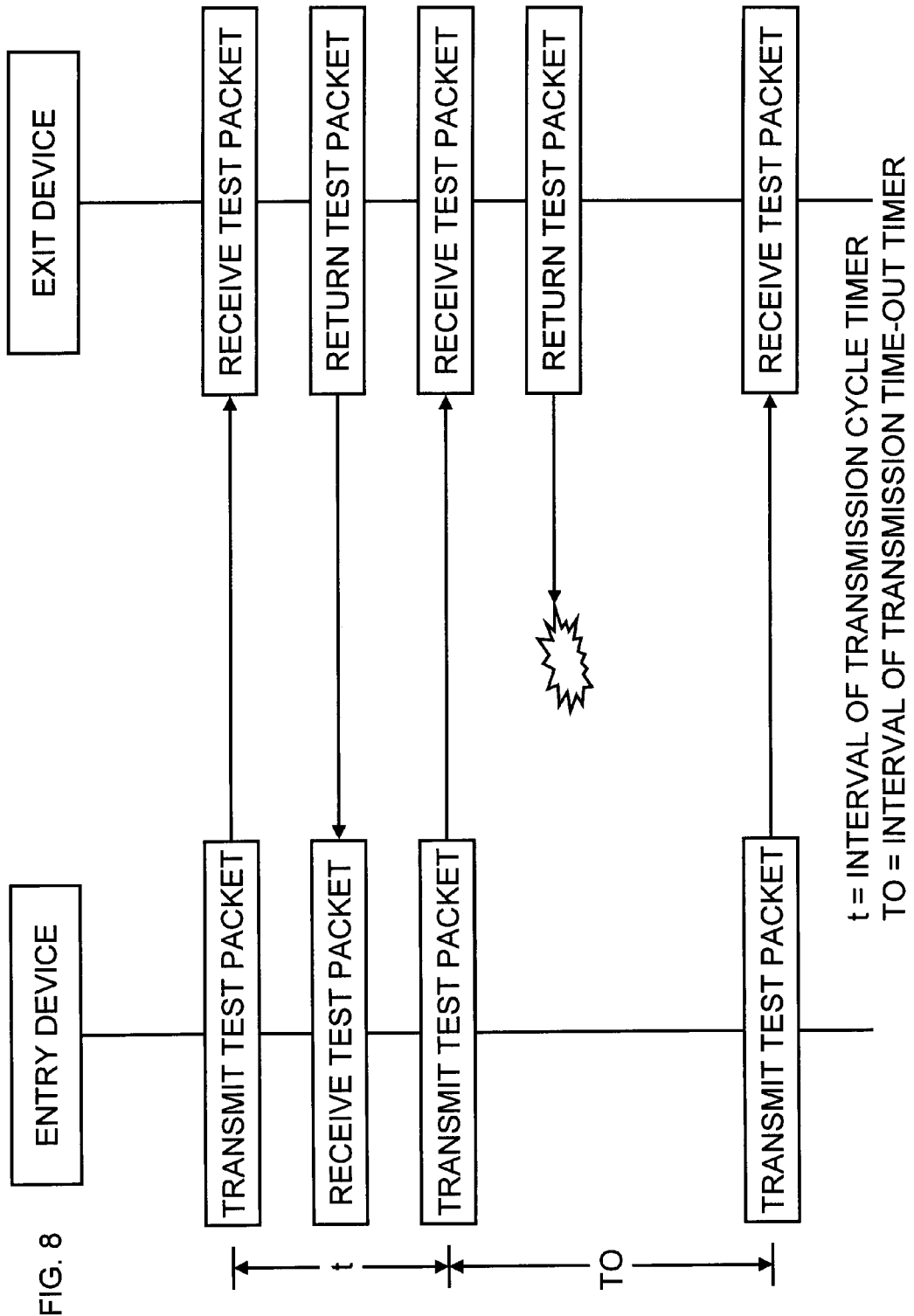

| | TRANSMISSION TIME | RECEPTION TIME | DELAY |
|---|---|---|---|
| HIGH PRIORITY ROUTE | 13:00:00 | 13:00:30 | 30 s |
| LOW PRIORITY ROUTE | 13:00:00 | 13:00:01 | 01 s |

FIG. 9A

| EXP | |
|---|---|
| 1 | HIGH PRIORITY |
| 2 | LOW PRIORITY |

FIG. 10B

| DELAY TEST PACKET No. | ROUTE | PRIORITY | TRANSMISSION CYCLE TIMER | TRANSMISSION TIME-OUT TIMER |
|---|---|---|---|---|
| 1 | A→B→C | HIGH | 15 [s] | 30 [s] |
| 2 | A→B→C | LOW | 40 [s] | 80 [s] |
| 3 | A→C | HIGH | 20 [s] | 40 [s] |
| 4 | A→C | LOW | 30 [s] | 60 [s] |

FIG. 14B

|  | PORT | ROUTE COST |
|---|---|---|
| APPARATUS A | P1 | 20 |
|  | P2 | 10 |
| APPARATUS B | P1 | 20 |
|  | P2 | 30 |
| APPARATUS C | P1 | 10 |
|  | P2 | 30 |

FIG. 15A

| PORT | DATA | APPARATUS A | APPARATUS B | APPARATUS C | APPARATUS E | APPARATUS F |
|---|---|---|---|---|---|---|
| P1 | IMAGE DATA | 100% | - | - | - | - |
| | OTHER DATA | 0% | - | - | - | - |
| P2 | IMAGE DATA | 0% | 100% | 100% | 0% | 0% |
| | OTHER DATA | 100% | 0% | 0% | 100% | 100% |

FIG. 16A

| PORT | DATA | APPARATUS A | APPARATUS B | APPARATUS C | APPARATUS E | APPARATUS F |
|---|---|---|---|---|---|---|
| P1 | IMAGE DATA | 100% | - | - | - | - |
| P1 | OTHER DATA | 0% | - | - | - | - |
| P2 | IMAGE DATA | 50% | 100% | 100% | 50% | 50% |
| P2 | OTHER DATA | 50% | 0% | 0% | 50% | 50% |

FIG. 16B

| PORT | | DATA | APPARATUS A | APPARATUS B | APPARATUS C | APPARATUS E | APPARATUS F |
|---|---|---|---|---|---|---|---|
| P1 | | IMAGE DATA | 80% | - | - | - | - |
| | | OTHER DATA | 20% | - | - | - | - |
| P2 | | IMAGE DATA | 0% | 80% | 80% | 0% | 0% |
| | | OTHER DATA | 100% | 20% | 20% | 100% | 100% |

FIG. 16C

| PORT | DATA | APPARATUS A | APPARATUS B | APPARATUS C | APPARATUS E | APPARATUS F |
|---|---|---|---|---|---|---|
| P1 | IMAGE DATA | 50% | - | - | - | - |
| | OTHER DATA | 50% | - | - | - | - |
| P2 | IMAGE DATA | 0% | 50% | 50% | 0% | 0% |
| | OTHER DATA | 100% | 50% | 50% | 100% | 100% |

FIG. 16D

| DELAY TEST PACKET | DELAY-LEVEL-0 | DELAY-LEVEL-1 | DELAY-LEVEL 2 |
|---|---|---|---|
| HIGH PRIORITY | POLICY-1 | POLICY-2 | POLICY-3 |
| LOW PRIORITY | POLICY-4 | POLICY-5 | POLICY-6 |

FIG. 18A

| DELAY TEST PACKET | DELAY-LEVEL-0 | DELAY-LEVEL-1 | DELAY-LEVEL-2 |
|---|---|---|---|
| HIGH PRIORITY | CLASS-MAP-1 | CLASS-MAP-2 | CLASS-MAP-3 |
| LOW PRIORITY | CLASS-MAP-4 | CLASS-MAP-5 | CLASS-MAP-6 |

FIG. 18B

NETWORK SYSTEM, NETWORK APPARATUS, ROUTE CHANGE METHOD, AND PROGRAM STORAGE MEDIUM STORING PROGRAM THEREOF

BACKGROUND OF THE INVENTION

1. Field of the Invention

The present invention relates to a network system, especially to a route change method based on a delay time for transferring a packet.

2. Description of the Related Art

To realize an economical packet network with little drop in the throughput that effectively uses network resources where routing reflecting an actual traffic state is performed without the need for any revision to relay routers, Japanese Unexamined Patent Application Publication No. 2002-044125 discloses a packet network where an incoming edge side router placed at an input side of a network and an outgoing edge side router installed at an output side transmit/receive a test packet with each other or give a time stamp to an IP (Internet Protocol) packet including user information so as to measure an actual round trip delay time or propagation delay time in each route. A route for transmitting a packet is selected according to the result of the measurement. It also discloses a technique for smoothing and using a plurality of measurement results.

To prevent line congestion by devising load distribution in a data exchange network and effective utilization of bypass lines with respect to the route selection system in the network, Japanese Unexamined Patent Application Publication No. H09-191322 discloses a data exchange route selection system. Each station of the data exchange network is provided with a delay time measurement means measuring a delay time of each route, a line utilizing rate measurement means measuring a line operating rate for each route and a delay allowable value setting means setting an allowable delay time between each terminal equipment under the control and an opposite terminal equipment. Then a route satisfying an allowable delay time of the terminal equipment among plural routes is selected for each communication and a route with a lower line operating rate is selected among the selected routes to average the line operating rate while keeping the response of the terminal equipment.

SUMMARY OF THE INVENTION

In the background art disclosed in the above-described patent documents, a delay time in a network is actually measured using a delay test packet. However, in the background art, there is no concept of QoS (Quality of Service) control which has been applied in an IP network in the recent years. Thus, delay measurement in accordance with characteristic of user data, such as delay measurement while distinguishing a high-priority packet and a low-priority packet, is not achieved in an IP network with QoS control.

Also, in the background art, when a result of a delay measurement is reflected on routing, an external network management apparatus is required to set route information.

In general, an IP device performs dynamic route management, such as RIP (Routing Information Protocol) or OSPF (Open Shortest Path First), and selects a route on the basis of a destination address of a packet. As in Policy Routing, route information is statically set in accordance with characteristic of user data. Thus, dynamic routing based on the fluctuating network conditions (delay conditions) has not been achieved.

In OSPF, Link State information is created in each IP device, and is distributed to other IP devices. The other IP devices build Link-State database on the basis of the received Link State information. An IP device can grasp a network topology on the basis of Link-State database. Also, in OSPF, routing is performed on the basis of cost values determined in accordance with a bandwidth of a line, by selecting a route which has a low cost value as an optimum route. In a network consisting of IP devices complying with OSPF, even if a network trouble occurs on a route, another route is selected, and restoration is performed promptly. However, as described above, it is not possible to grasp the network conditions other than a network trouble, and to perform optimum routing to meet characteristic of user data. Specifically, even if the optimum route determined by an IP device includes a line in a congested condition or nearly congested condition, the routing is not changed, because it is not recognized as a network trouble. In this case, a serious delay occurs, and thus there arises a critical problem in a service which requires strict real-time processing.

It is an object of the present invention to provide a route change method which allows a routing based on characteristic of user data in IP network and the like.

An IP network includes network devices such as a router or a layer-2 switch (L2-SW). First, an IP device located at the entry of the network (referred to as an entry device) generates a delay test packet which meets characteristic of user data, and transmits the delay test packet to an IP device located at the exit of the network (referred to as an exit device) through each of two different routes, i.e. a first priority route and a second priority route (the same applies in case of three routes or more). On receiving the delay test packet, the exit device returns a reply for the delay test packet to the entry device through the same route. Thus, it becomes possible to measure a delay time between the entry and the exit of the network, and an actual route for transferring user data is determined on the basis of the measured value. In the following, a detailed description will be given on two points, "generation of a delay test packet which meets characteristic of user data" and "performing dynamic routing based on the delay time".

In an IP network, QoS is set in accordance with characteristic of user data. Image data or the like is regarded as a high-priority packet and other data is regarded as a low-priority packet. Priority control is performed by the overall network. For example, in an IPv4 (Internet Protocol Version 4) network, a priority of a packet is explicitly indicated in a ToS (Type of Service) field of IP header. All the devices constituting the network provide the same priority control in accordance with a value in the ToS field.

In the present invention, a delay test packet is generated while setting a ToS/DiffServ (differentiated services) field of IP header to meet QoS definition applied in the IP network. The delay test packet which meets characteristic of user data allows the measurement of the network delay fluctuating in real time.

When an IP network is set up, routes are designed redundantly in consideration of availability. For selecting one route among from a plurality of routes, a dynamic routing such as RIP or OSPF is performed. In this routing, a route is selected on the basis of a destination address of user data. Policy Routing or the like is also used in order to achieve routing in accordance with characteristic of user data.

However, in Policy Routing, a route is selected statically in accordance with characteristic of user data, and it is not possible to follow the network condition which is dynamically fluctuating all the time. Also, in LSP (Label Switched Path: switching a priority route and a non-priority route) as traffic engineering in MPLS (Multi Protocol Label Switch)

network, Classify parameter is set statically, and thus it is not possible to change a route dynamically on the basis of delay conditions.

In the present invention, it becomes possible to carry out routing which meets quality condition of the network by changing information, such as a Policy or a Classify parameter, etc., dynamically on the basis of the delay time obtained by the above-described means.

According to an embodiment of a first aspect of the present invention, there is provided a network system which is capable of measuring a delay time in transferring a test packet. The network system includes: a test packet transmitter which transmits the test packet which includes priority information which indicates priority of the test packet, and records a transmission time of transmitting the test packet; a test packet receiver which receives the test packet which is transmitted from the test packet transmitter; a reply packet transmitter which transmits a reply packet which includes the priority information which is included in the test packet which is received by the test packet receiver; a reply packet receiver which receives the reply packet which is transmitted from the reply packet transmitter, and records a reception time of receiving the reply packet; and a delay calculator which calculates the delay time on the basis of the transmission time and the reception time.

The network system may further include: a route DB (database) storage which stores information which includes a route of transfer which corresponds to the priority information, wherein the test packet transmitter transmits the test packet via the route of transfer which corresponds to the priority information; and a route changer which changes the route of transfer which corresponds to the priority information on the basis of the delay time.

In the network system, the test packet may include a flag which has a value which indicates the test packet, a source address which indicates the entry device, and a destination address which indicates the exit device. the reply packet may be derived from the test packet by rewriting the flag with a value which indicates the reply packet, and switching the destination address with the source address.

The network system may be an MPLS network system and the test packet may include the priority information in an Exp field of an MPLS header.

In the network system, the priority information in the Exp field of the MPLS header may be changed on the basis of the delay time.

In the network system, a VPN may be established between the test packet transmitter and the test packet receiver and between the reply packet transmitter and the reply packet receiver, and the route changer may change the route of transfer which corresponds to the priority information on the basis of the delay time.

The network system may be an L2-VLAN network system and the test packet may include the priority information in a PRI field of a VLAN-Tag.

In the network system, the priority information in the PRI field of the VLAN-Tag may be changed on the basis of the delay time.

According to the embodiment of the first aspect of the present invention, it may be performed dynamic routing which reflects characteristic of user data, and thus it may provide higher quality services to the user data.

According to an embodiment of a second aspect of the present invention, there is provided a network apparatus for measuring a delay time in transferring a first test packet. The network apparatus includes: a route DB storage which stores information which includes a route of transfer which corresponds to first priority information which indicates priority of the first test packet; a test packet transmitter which transmits the first test packet which includes the first priority information via the route of transfer which corresponds to the first priority information, and records a transmission time of transmitting the first test packet; a reply packet receiver which receives a first reply packet which is transmitted for replying to the first test packet, and records a reception time of receiving the first reply packet; a delay calculator which calculates the delay time on the basis of the transmission time and the reception time; and a route changer which changes the route of transfer which corresponds to the first priority information on the basis of the delay time.

When the network apparatus is capable of communicating with an entry device which transmits a second test packet, the network apparatus may further include: a test packet receiver which receives the second test packet which includes second priority information which indicates priority of the second test packet, a flag which has a value which indicates the second test packet, a source address which indicates the entry device, and a destination address which indicates the network apparatus; and a reply packet transmitter which transmits a second reply packet which includes the second priority information and which is derived from the second test packet by rewriting the flag with a value which indicates the second reply packet, and switching the destination address with the source address. This configuration allows the network apparatus serve as both the entry device and the exit device.

According to an embodiment of a third aspect of the present invention, there is provided a network apparatus which measures a delay time in transferring a test packet, wherein the network apparatus is capable of communicating with an entry device which transmits the test packet. The network apparatus includes: a test packet receiver which receives the test packet which includes priority information which indicates priority of the test packet which includes a flag which has a value which indicates the test packet, a source address which indicates the entry device, and a destination address which indicates the network apparatus; and a reply packet transmitter which transmits a reply packet which includes the priority information, and which is derived from the test packet by rewriting the flag with a value which indicates the reply packet, and switching the destination address with the source address.

According to an embodiment of a fourth aspect of the present invention, there is provided a route change method which is executed by a network apparatus which measures a delay time in transferring a test packet, wherein the network apparatus includes a route DB storage which stores information which includes a route of transfer which corresponds to priority information which indicates priority of the test packet. The route change method includes the steps of: transmitting the test packet which includes the priority information via the route of transfer which corresponds to the priority information; recording a transmission time of transmitting the test packet; receiving a reply packet which is transmitted for replying to the test packet; recording a reception time of receiving the reply packet; calculating the delay time on the basis of the transmission time and the reception time; and changing the route of transfer which corresponds to the priority information on the basis of the delay time.

According to an embodiment of a fifth aspect of the present invention, there is provided a program storage medium which is readable by a computer, wherein the program storage medium stores a program of instructions for the computer to execute a route change method based on a delay time in transferring a test packet, and the computer includes a storage for storing information which includes a route of transfer which corresponds to priority information which indicates priority of the test packet. The route change method includes the steps of: transmitting the test packet which includes the priority information via the route of transfer which corresponds to the priority information; recording a transmission time of transmitting the test packet; receiving a reply packet which is transmitted for replying to the test packet; recording a reception time of receiving the reply packet; calculating the delay time on the basis of the transmission time and the reception time; and changing the route of transfer which corresponds to the priority information on the basis of the delay time.

BRIEF DESCRIPTION OF THE DRAWINGS

FIG. 3 is a diagram showing an example of a routing table of the network apparatus in FIG. 1;

FIGS. 4A and 4C are diagrams showing examples of a Policy according to the first embodiment of the present invention;

FIG. 4B is a diagram showing an example of QoS definition according to the first embodiment of the present invention;

FIG. 5A is a diagram showing IP header format according to the first embodiment of the present invention;

FIG. 5B is a diagram showing setting information for the delay test packet generation according to the first embodiment of the present invention;

FIG. 8 is a diagram showing an example of a time chart of measuring a delay time between an entry device and an exit device according to the first embodiment of the present invention;

FIG. 9A is a diagram showing an example of a result of delay measurement according to the first embodiment of the present invention;

FIGS. 10A and 10B are diagrams illustrating a delay test packet in an MPLS network according to a second embodiment of the present invention;

FIG. 14B is an example of setting information for the delay test packet generation according to the third embodiment of the present invention;

FIG. 15A shows a route cost definition of each network apparatus according to the third embodiment of the present invention;

FIGS. 16A, 16B, 16C, and 16D are diagrams illustrating the update of the QoS priority definition on the basis of the delay time according to another embodiment of the present invention;

FIGS. 18A and 18B are diagrams explaining route-change setting information according to another embodiment of the present invention.

DESCRIPTION OF THE PREFERRED EMBODIMENTS

First Embodiment of the Present Invention

1. System Configuration

Figure 1:
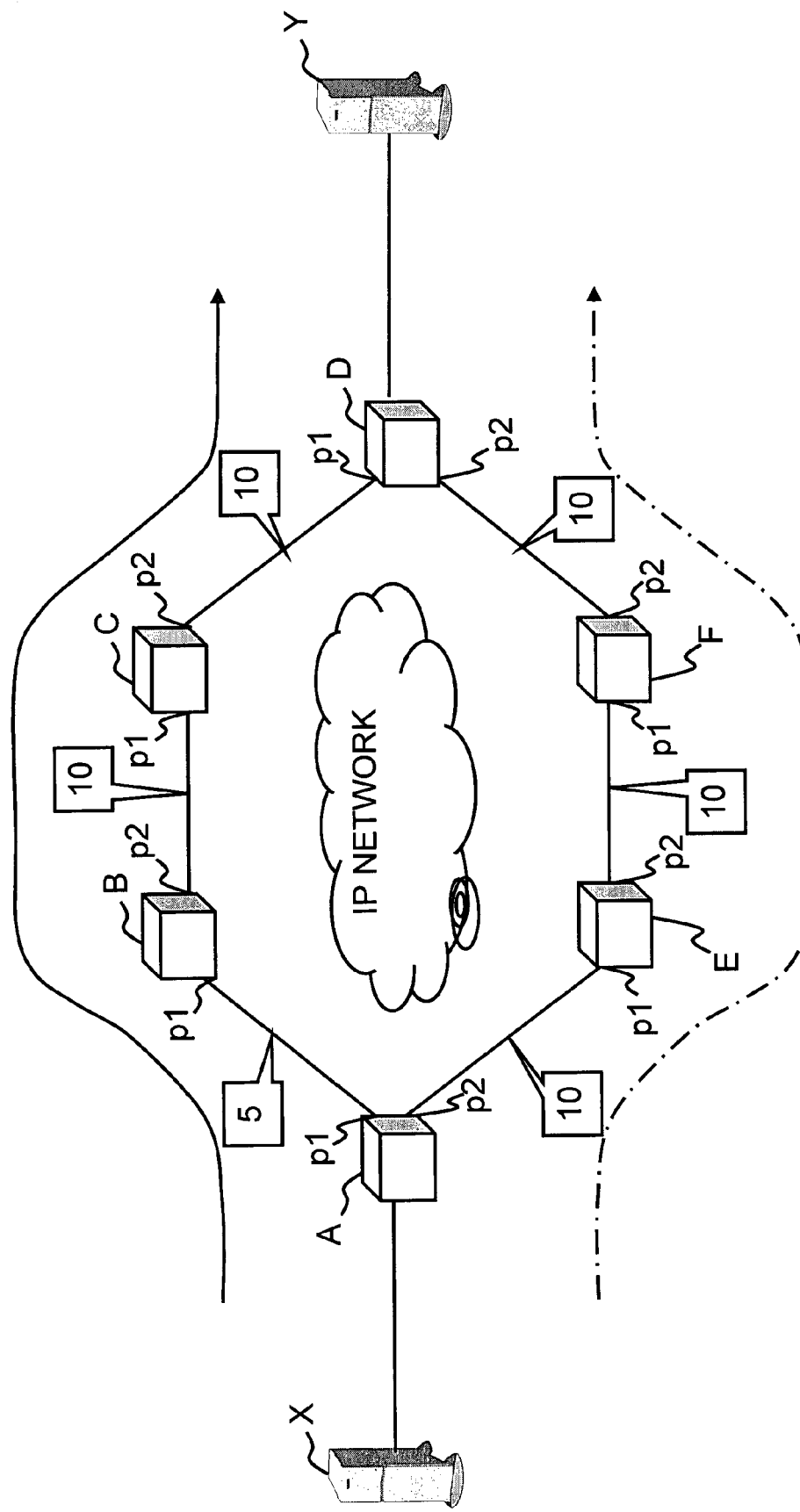
FIG. 1 is a network configuration diagram of network apparatuses according to a first embodiment of the present invention.

FIG. 1 is a network configuration diagram of network apparatuses according to a first embodiment of the present invention. FIG. 1 shows several network apparatuses A, B, C, D, E, and F through which a computer X and a computer Y performs IP communication. Another network apparatus may, however, be disposed between the computer X and the network apparatus A, as well as between the computer Y and the network apparatus D. In FIG. 1, there are two communication routes between the computer X and the computer Y, i.e. a route denoted by a solid arrow line and a route denoted by a dashed dotted arrow line. However, there may be three routes or more.

1.1 Block Configuration

Figure 2:
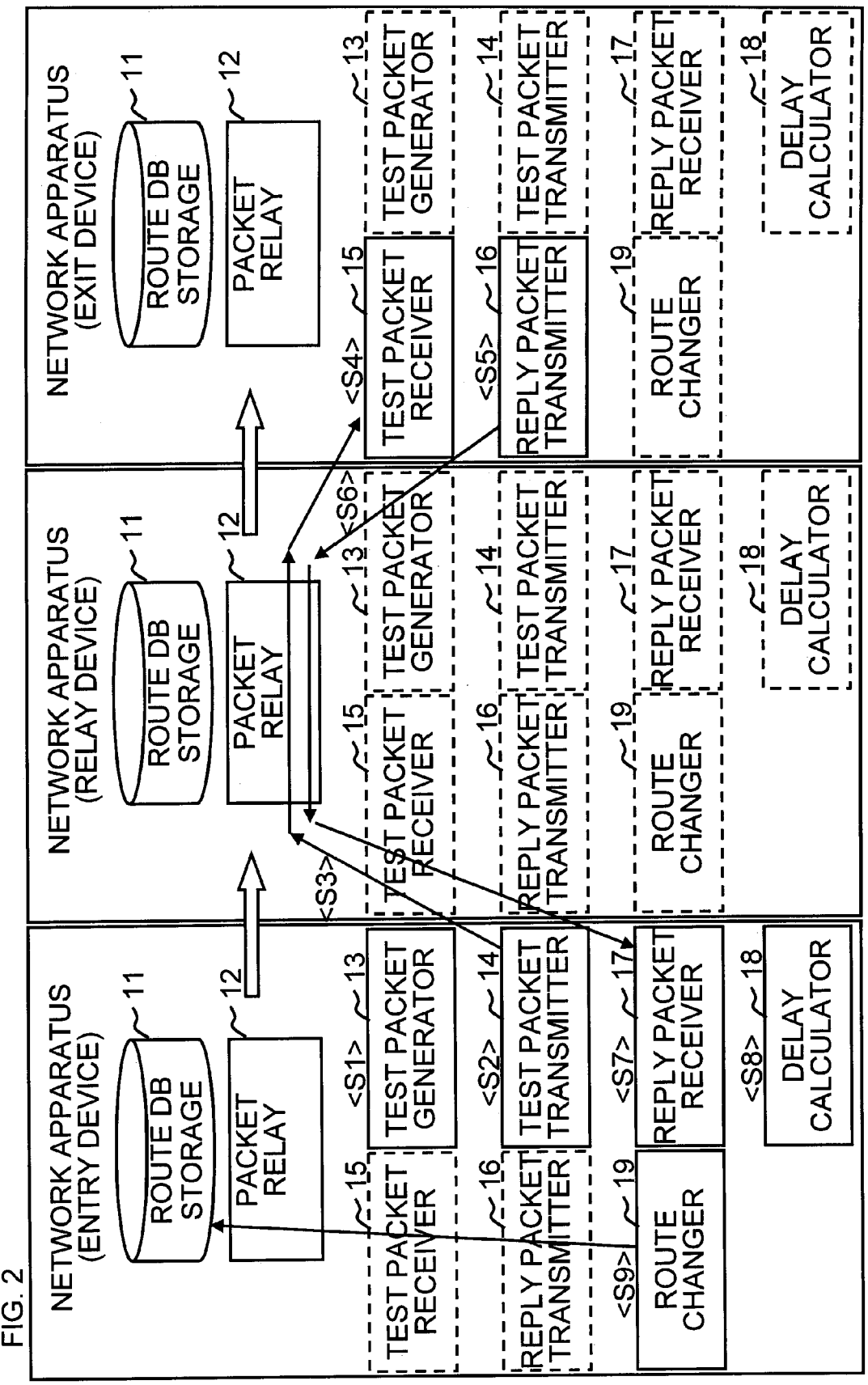
FIG. 2 is a block configuration diagram of a network apparatus according to the first embodiment of the present invention.

FIG. 2 is a block configuration diagram of a network apparatus according to the first embodiment of the present invention.

The network apparatus according to the present invention includes a route DB storage 11, packet relay 12, test packet generator 13, test packet transmitter 14, reply packet receiver 17, delay calculator 18, route changer 19, test packet receiver 15, and reply packet transmitter 16.

The route DB storage 11 contains route information and a routing table. The route information and the routing table may be recorded separately. The route DB storage 11 records the route information when the route changer 19 carries out a route change. The routing table is that a normal router holds and manages.

The packet relay 12 is a component held in a normal router.

The test packet generator 13 has a function of generating a delay test packet according to a priority level. The delay test packet is generated for each priority level and for each route which can be controlled. For example, if there are priority levels of a high priority and a low priority, and each level has one route, two types of delay test packets can be generated. In the same manner, if there are priority levels of a high priority and a low priority, and each level has two routes, then four types of delay test packets can be generated.

The test packet transmitter 14 has a function of transmitting a delay test packet generated by the test packet generator 13 to a network apparatus which is an exit device.

The test packet receiver 15 has a function of receiving a delay test packet from a network apparatus that has transmitted the delay test packet.

The reply packet transmitter 16 has a function of returning the delay test packet received by the test packet receiver 15 to the network apparatus that has transmitted the delay test packet.

The reply packet receiver 17 has a function of receiving a reply for a delay test packet (referred to as a reply-delay test packet) transmitted from a network apparatus that has received the delay test packet.

The delay calculator 18 has functions of recording the time when a delay test packet was transmitted, of recording the time when a reply-delay test packet was received, and of calculating a time period from the transmission of a delay test packet to the reception of the reply-delay test packet on the basis of these recorded times.

The route changer 19 has a function of executing a route change on the basis of the delay time as necessary.

In this manner, by the present invention, it is possible to calculate a delay time for each priority and for each route in coordination of the entry device and the exit device and to change routing on the basis of the delay time. Accordingly, routing is performed in accordance with the current network conditions, and thus there is an advantage in that the communication quality can be stably maintained in accordance with the priorities of QoS.

Specifically, if an IP network is constituted by IPv4, when the test packet generator of the entry device generates a delay test packet, ToS field or DiffServ field of IP header is set to QoS-defined priority. Also, if an IP network is constituted by IPv6 (Internet Protocol Version 6), when the test packet generator of the entry device generates a delay test packet, TrafficClass field of IP header is set to QoS-defined priority.

As is understood by referring to FIG. 2, when measuring a time, the entry device operates the test packet generator 13, the test packet transmitter 14, the reply packet receiver 17, the delay calculator 18, the route changer 19, and the route information stored in the route DB storage 11. The relay device operates the packet relay 12 and the routing table stored in the route DB storage 11. The exit device operates the test packet receiver 15 and the reply packet transmitter 16.

Accordingly, for the network apparatus serving as the relay device only, an existing router may be used. The network apparatus specified as a relay device in FIG. 1 may correspond to an entry device in another network. In such a case, the relay device works as an entry device, and thus it is necessary to use a network apparatus including the components of the present invention rather than an existing router. Also, a network apparatus working not only as an entry device but also the relay device and the exit device may become necessary. It is desirable to provide a network apparatus having functions of an entry device, a relay device, and an exit device when versatility of a network application is taken into consideration. By doing so, each role of the devices can be performed by the respective setting.

1.2 OSPF

A description will be given on OSPF using the drawings. FIG. 3 is a diagram showing an example of a routing table of the network apparatus in FIG. 1.

FIG. 1 shows the network apparatuses on the communication routes used when a computer X and a computer Y communicate with each other. The network configuration in FIG. 1 is just an example. Another network apparatus may be disposed between one of the computers and the adjacent network apparatus or between network apparatuses adjacent each other and the communication through the disposed network apparatus may be included. In FIG. 1, when the communication from the computer X to the computer Y is assumed, the entry device is the network apparatus that first receives a packet transmitted from the upper-stream computer X. In FIG. 1, the exit device is the last network apparatus that relays a packet from the computer X to the down-stream computer Y. In other words, among the network apparatuses A, B, C, D, E, and F which constitute the IP network in the communication from the computer X to the computer Y, the network apparatus A at an entry point is the entry device, and the network apparatus D at an exit point is the exit device.

Two routes can be taken for the communication between the computer X and the computer Y. That is to say, the route (A→B→C→D) and the route (A→E→F→D) can be taken. In OSPF, a cost value is determined between adjacent network apparatuses, and a route which has the smallest cost value obtained by accumulating the cost values on the route is selected as an optimum route. In FIG. 1, the cost value of the route (A→B→C→D) is 25, and the cost value of the route (A→E→F→D) is 30. The former route has a smaller cost value, and thus the route (A→B→C→D) is selected as an optimum route. Thus, when the network apparatus A receives a packet from the computer X, the network apparatus A transmits the received packet via the port p1. Regardless of whether a packet needs immediacy or not, the packet transmitted from the computer X is transferred to the computer Y through the same route.

1.3 QoS

It is not possible to achieve routing which meets data characteristic by the routing based only on OSPF. In order to achieve this, Policy Routing can be employed. For example, consider the case where a Policy is established to prioritize image data over other data and to transmit image data through a different route from other data. FIGS. 4A and 4C are diagrams showing examples of a Policy according to the first embodiment of the present invention. FIG. 4B is a diagram showing an example of QoS definition according to the first embodiment of the present invention. By defining a Policy as shown in FIG. 4A, image data is transmitted with high priority by selecting the route (A→B→C→D) as shown in FIG. 1, and other data is transmitted with low priority by selecting the route (A→E→F→D). In this manner, Policy Routing becomes possible by statically defining the port of the network apparatus A for respective priority data. However, by Policy Routing, it is not possible to grasp the dynamic network conditions (delay conditions) and to select the optimum route while maintaining the user data.

In addition to establishing the Policy as shown in FIG. 4A, it is possible to define the priority of QoS as shown in FIG. 4B. That is to say, in addition to the setting to assign the data type to each port, the bandwidth of the port is further divided, and the data type is assigned to the divided bandwidth. By this means, it is possible to transmit packets of different data types through the same route. That is, packets with different priorities can be transmitted through the same route. It is also possible to specify the division ratio of the bandwidth. By the QoS priority definition of FIG. 4B, a packet of image data with high priority is transmitted mainly through the route (A→B→C→D), and a packet of other data with low priority is transmitted mainly through the route (A→E→F→D).

FIG. 5A is a diagram showing IP header format according to the first embodiment of the present invention. As shown in FIG. 5A, when QoS priority is defined for the port of each network apparatus constituting a network, the priority is stored in the ToS field of the header portion of an IP packet to control route for a packet from the user in accordance with the data characteristic.

The header portion (IP header) of an IP packet (v4) includes a version, a header length, a type of service (ToS), a total length, an identification, flags, a fragment offset, a time to live (TTL), a protocol, a header checksum, a source IP address, a destination IP address. IP header may include an optional data and padding characters. IP data follows IP header.

The ToS field is located at the third position from the beginning of IP header, and consists of 8 bits. The priority is expressed using three bits from 0-th bit to 2nd bit out of 8-bit ToS field.

1.4 Time Flag

In the network apparatus according to the present embodiment, a time flag (TF) is disposed at the beginning of the IP data section of an IP packet (refer to FIG. 5A). When the delay test packet is created, "1" is stored in the time flag, and when the delay test packet is returned as a reply-delay test packet, "0" is stored in the time flag. Storing a value in the time flag in this manner, it is possible to identify whether a packet is a delay test packet or a reply-delay test packet by referring to the time flag.

In this manner, by the present invention, a time flag is included in a delay test packet at transmission time, and the time flag value is updated at reply time, and when the time flag value is updated, the reply-delay test packet is received to calculate the delay time. Thus, there is an advantage in that reply-delay test packet having not been subjected to appropriate processing at reply time is disregarded and adequate operation can be performed.

The method of not using a reply-delay test packet when a time flag value is not updated specifically includes a method in which the reply packet receiver does not receive a reply-delay test packet having a not-updated time flag value, and a method in which the reply packet receiver receives the reply-delay test packet in the meantime regardless of whether or not the time flag value has been updated, and if the time flag value has not been updated, the reply-delay test packet is discarded.

1.5 Route Change

The route changer 19 executes a route change on the basis of the delay time. In a network using OSPF, a route change is executed by the update of the cost value of the relevant portion and the update of Link State information. Also, a route change can be carried out by changing the Policy. Policies or OSPF cost values before and after the change is recorded in the route DB storage 11 as the route information.

For a specific method of changing to new routing on the basis of a delay time by the route changer, as described in the below-described embodiments, there are a method of changing the Policy, a method of changing cost values of OSPF, a method of changing a VPN (virtual Private Network) path, and a method of changing a blocking port by changing the cost values of VLAN (Virtual Local Area Network). Also, "on the basis of a delay time" includes not only the inquiry on whether a delay time is greater than a predetermined threshold value, but also the comparison of delay times of the routes between different entry devices to exit devices having the same priority level (it is desirable to select the optimum route after the comparison, and to include not only a delay time but also a bandwidth in a determination item for selection).

2. Operation

It is assumed that the QoS definition has been completed by FIG. 4B. Also, the setting has been carried out in advance to measure a delay time between the network apparatus A as the entry device and the network apparatus D as the exit device. Specifically, the network apparatus A is set with an indication which indicates that this network apparatus is the entry device and an address of the network apparatus D as the exit device. The network apparatus D is set with an indication which indicates that this network apparatus is the exit device and an address of the network apparatus A as the entry device. The configuration may be such that only the network apparatus A as the entry device is set to measure a delay time in advance. Specifically, the network apparatus A is set with an indication which indicates that this network apparatus is the entry device and an address of the network apparatus D as the exit device. In this case, the network apparatus D as the exit device can transmit a reply-delay test packet to the network apparatus A in accordance with the source IP address of IP header information of the delay test packet.

The test packet generator 13 of the entry device generates a delay test packet which meets characteristic of user data (FIG. 2 <S1>). FIG. 5A shows a delay test packet having the setting of high priority in the ToS field of IP header. The computer X may write a value in accordance with an application program, in the ToS field of IP header of the real data to be transmitted from the computer X to the computer Y. The destination IP address of the delay test packet is an address of the exit device.

This delay test packet can be generated for each priority defined in QoS and for each route. For example, in FIG. 1, the delay test packet can be generated for the combinations of whether high priority or low priority and whether the first route or the second route. FIG. 5B is a diagram showing setting information for the delay test packet generation according to the first embodiment of the present invention. The test packet generator 13 generates the delay test packet on the basis of setting information for the delay test packet generation shown in FIG. 5B. This setting information for the delay test packet generation is set in the entry device by the user. The configuration may be such that the entry device outputs a currently-used route to the administrator's terminal (a terminal to be used for setting a network apparatus by the user) in response to the user's request, so that the user can easily set information for delay test packet generation. The alternative route at delay occurrence time is not currently used, and thus needs to be set by the user. However, when the Policy at delay occurrence time is taken in, or the route of the case of changing the cost value in OSPF is taken in, it is possible to support the setting in which the route at delay occurrence time can be presented to the user in the same manner. In this manner, at normal time, the entry device can grasp the route at delay occurrence time, setting information for the delay test packet generation is automatically generated, and thus a network applied the present invention can also be built by the user carrying out the existing settings. Also, the entry device may distribute setting information for the delay test packet generation to the relay device or the exit device as necessary.

Also, the test packet generator 13 sets "1" to TF (Time Flag) in the IP data section of an IP packet as described above.

Figure 6:
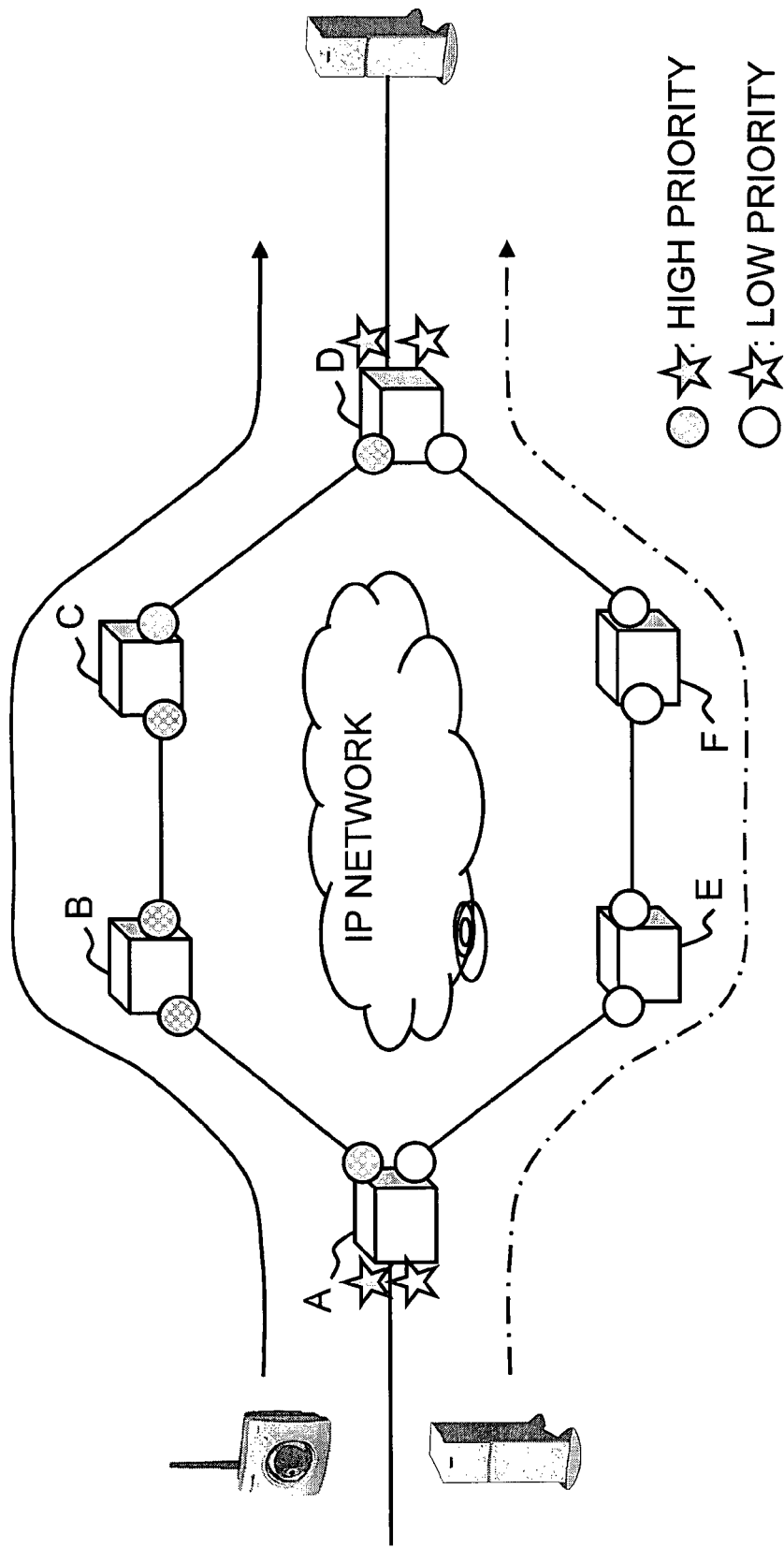
FIG. 6 is a diagram illustrating priority control using ToS field according to the first embodiment of the present invention.

The requirement for generating a delay test packet is, for example, the case where setting information for the delay test packet generation is set. At that time, a packet for each priority is generated for each route in accordance with setting information for the delay test packet generation. FIG. 6 is a diagram illustrating priority control using ToS field according to the first embodiment of the present invention. In FIG. 6, four types of delay test packets are generated. However, all the types of delay test packets may not be generated simultaneously, and the generation of delay test packets and the calculation of a delay time may be executed for each type. If the elapsed time from a delay measurement of one type to a delay measurement of another type is long, the measurements may not be carried out in the same network conditions. Thus, it is desirable that the elapsed time is as short as possible.

The moment of the transmission of the delay test packet is, for example, after the setting of information for the delay test packet generation. At that time, a packet is generated, and is transmitted via its port. The port for transmission is determined on the basis of the route and the priority of the delay test packet. This is because if the port is determined only in accordance with a routing table, only the current route is selected.

The test packet transmitter 14 of the entry device transmits a delay test packet to the exit device of the network at regular intervals in accordance with setting information for the delay test packet generation after the generation of the delay test packet (FIG. 2 <S2>). The transmission interval can be set arbitrarily at the entry device. The address of the exit device is usually included in the routing table of the entry device.

Figure 7:
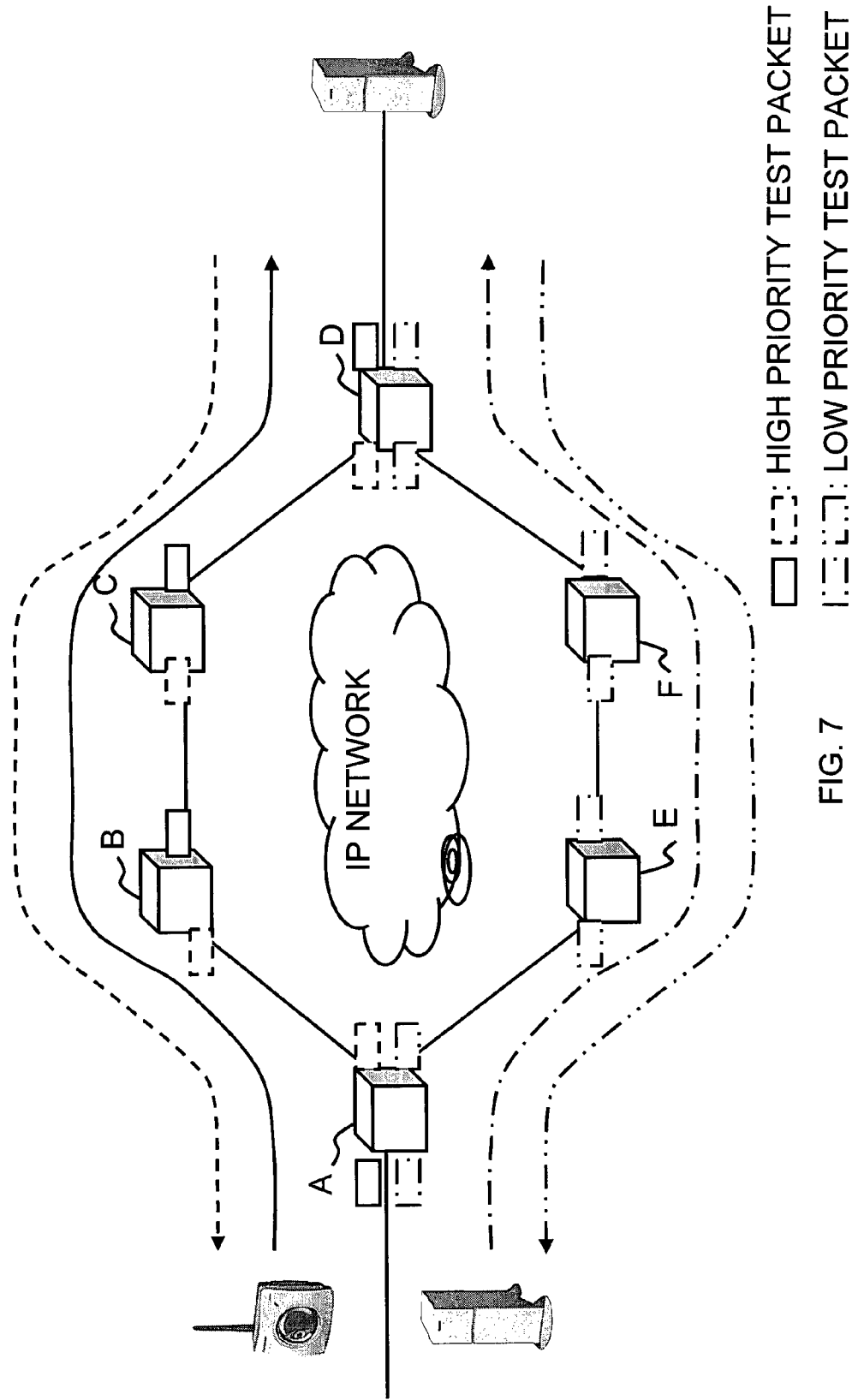
FIG. 7 is a diagram illustrating a route of a delay test packet for each priority according to the first embodiment of the present invention.

After transmission, the packet goes through the relay device, which is a part of the devices to be the target of the QoS priority definition, and reaches the exit device (transmission through the route conforming to QoS). FIG. 7 is a diagram illustrating a route of a delay test packet for each priority according to the first embodiment of the present invention. In FIG. 7, the delay test packet reaches the exit device through the network apparatuses B and C, which are the relay devices, via the route (A→B→C→D), and the delay test packet reaches the exit device through the network apparatuses E and F, which are the relay devices, via the route (A→E→F→D). That is to say, the delay test packet is relayed using the packet relay 12 of the network apparatuses B, C, E, and F (FIG. 2 <S3>).

The test packet receiver 15 of the exit device receives the delay test packet (FIG. 2 <S4>). FIG. 7 shows the state in which the network apparatus D, the exit device, is receiving high-priority (and low-priority) delay test packets from the network apparatus C, and is receiving low-priority (and high-priority) delay test packets from the network apparatus F.

As shown by FIG. 2 <S5>, the reply packet transmitter 16 of the exit device returns the packet toward the entry device through the same priority definition (returns through the route conforming to QoS). Here, at the time of reply, TF in the IP data section of the IP packet is set to "0", and the reply-delay test packet is returned. In general, the return route is established by the exit device transmitting the reply-delay test packet via the same port. However, the exit device may receive the delivery of setting information for the delay test packet generation from the above-described entry device, and may reply on the basis of the setting information for the delay test packet generation. The identification of the received delay test packet is carried out by a method of identifying from the route and the priority, or by the method in which the entry device writes the identification information of the delay test packet (delay test packet No.) into IP header section or the IP data section, and the exit device reads out the information.

The relay device relays a reply-delay test packet to the opposite side in the same manner as relaying a delay test packet (FIG. 2 <S6>).

The reply packet receiver 17 of the entry device receives the reply-delay test packet (FIG. 2 <S7>). At this time, the packet may be received after confirming that TF in the IP data section of the received packet is "0", or the packet may be received once and then may be discarded if the TF is not "0".

The delay calculator 18 of the entry device calculates a round-trip time of a packet on the basis of the time stamp at the time of transmitting a delay test packet and the time of receiving the reply-delay test packet (FIG. 2 <S8>). Here, the entry device records the time of transmitting a delay test packet to the exit device as a time stamp in the buffer. It is preferable to record, linked with a time stamp, the destination IP address, the priority, and the route, thus the time stamp can be identified by the destination IP address, the priority, and the route. As another method, identification information which uniquely identifies a packet may be stored in the IP data section of a delay test packet. This identification information is recorded, linked with the time stamp, and the time stamp is identified on the basis of the identification information. The identification information may be created so that a packet can be identified uniquely by the identification information itself. Alternatively, the identification information may be created so that a packet can be identified uniquely on the basis of the identification information together with the other information, such as an address or a priority.

When the entry device receives a reply-delay test packet, the entry device confirms the value of TF in the IP data section is "0" and calculates round-trip time between the entry device and the exit device. Instead of the round-trip time, a delay time of one way from the entry device to the exit device may be calculated and used. In that case, it is necessary that each of the entry device and the exit device has a timer, and those two timers are synchronized. For those skilled in the art, a method of synchronizing the timers, NTP (Network Time Protocol) for example, is already apparent, and thus a detailed description will not be given. The entry device holds the transmission time of a delay test packet, the exit device writes a reception time into the IP data section or IP header section as a time stamp, and the entry device reads the time stamp from the reply-delay test packet. Thus, it is possible to obtain the delay time of one way from the entry device to the exit device by subtracting the held transmission time from the time of the read time stamp.

Also, when the definition of the user data (QoS) has been changed, or a delay test packet cannot be recognized because of a trouble, etc., the transmission at regular intervals is carried out again on the basis of the value of a transmission time-out timer. FIG. 8 is a diagram showing an example of a time chart of measuring a delay time between an entry device and an exit device according to the first embodiment of the present invention. In this example, the entry device transmits a delay test packet to the exit device at each interval "t" of transmission cycle timer. When an interval "TO" of the transmission time-out timer has passed from the time of the transmission of a delay test packet to the exit device, the entry device transmits a delay test packet again to the exit device. The entry device transmits a delay test packet in accordance with the transmission cycle timer when the entry device has received a reply-delay test packet from the exit device. The entry device transmits a delay test packet in accordance with the transmission time-out timer when the entry device could not receive a reply-delay test packet from the exit device. The transmission time of a delay test packet is stored in the buffer as a time stamp, and thus the entry device can calculate the elapsed time from the transmission of the delay test packet. In FIG. 8, in response to the first delay test packet from the entry device, a reply-delay test packet from the exit device has been received by the entry device, and thus the second delay test packet is transmitted after the interval "t" of the transmission cycle timer has passed from the transmission of the first delay test packet. On the other hand, in response to the second delay test packet from the entry device, a reply-delay test packet from the exit device has not been received by the entry device, and thus a delay test packet is sent again after the interval "TO" of the transmission time-out timer has passed from the time of the transmission of the second delay test packet. The reason why the second reply-delay test packet corresponding to the second delay test packet has not been received by the entry device is that, for example, a network trouble has occurred, the exit device has a trouble, the route has changed, and the like. It is desirable to inform the incident to the computer used by the network manager or the SNMP (Simple Network Management Protocol) manager of the network management system after a delay test packet is retransmitted for a predetermined number of times or more. The intervals of the transmission cycle timer and the transmission time-out timer are determined by the system operator.

The entry device can grasp the delay conditions of each route of the network by periodically performing the above-described operations for each user data of "image data" and "other data".

Figure 9B:
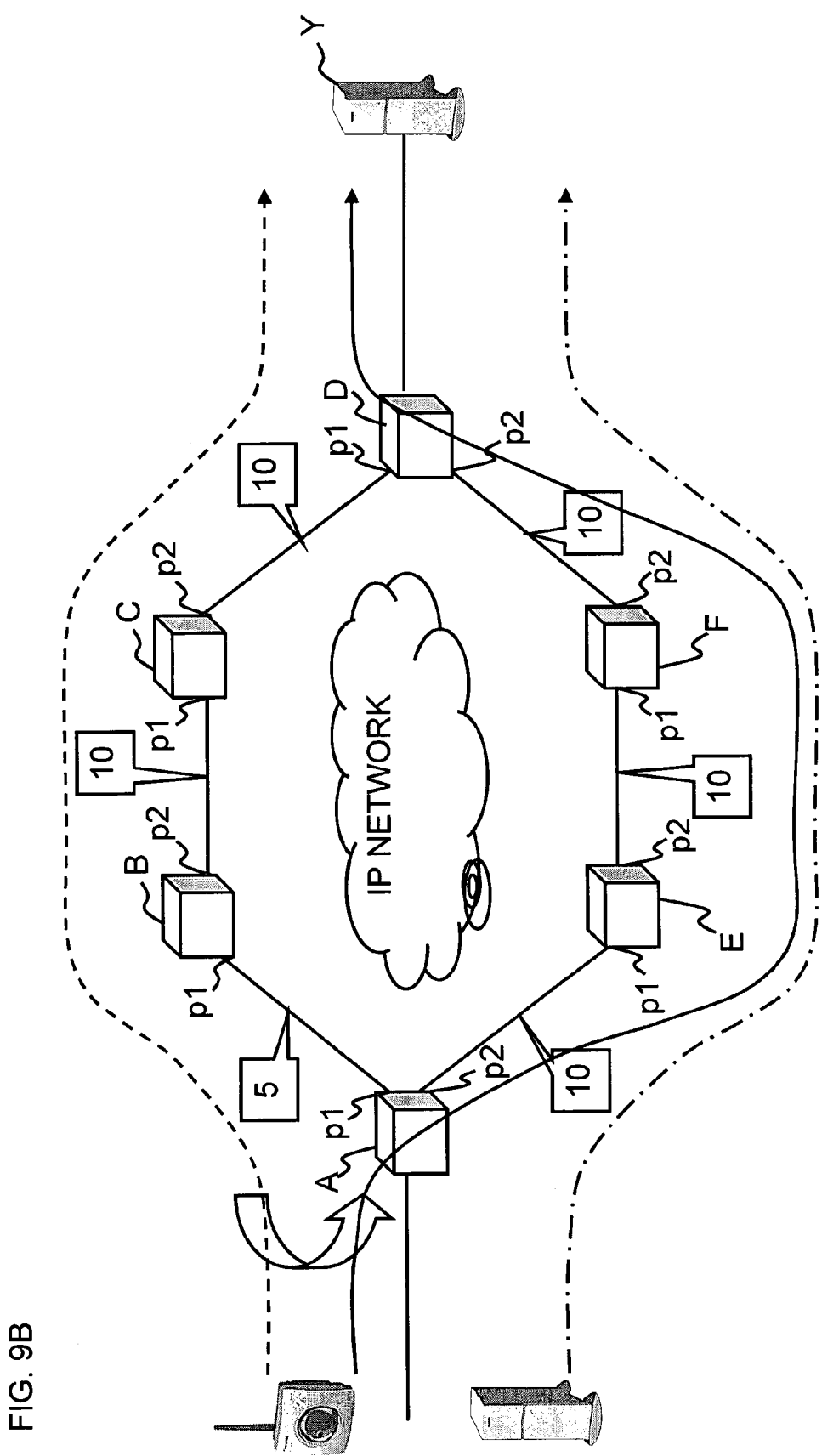
FIG. 9B is a diagram illustrating a route change due to a delay occurrence according to the first embodiment of the present invention.
Figure 9C:
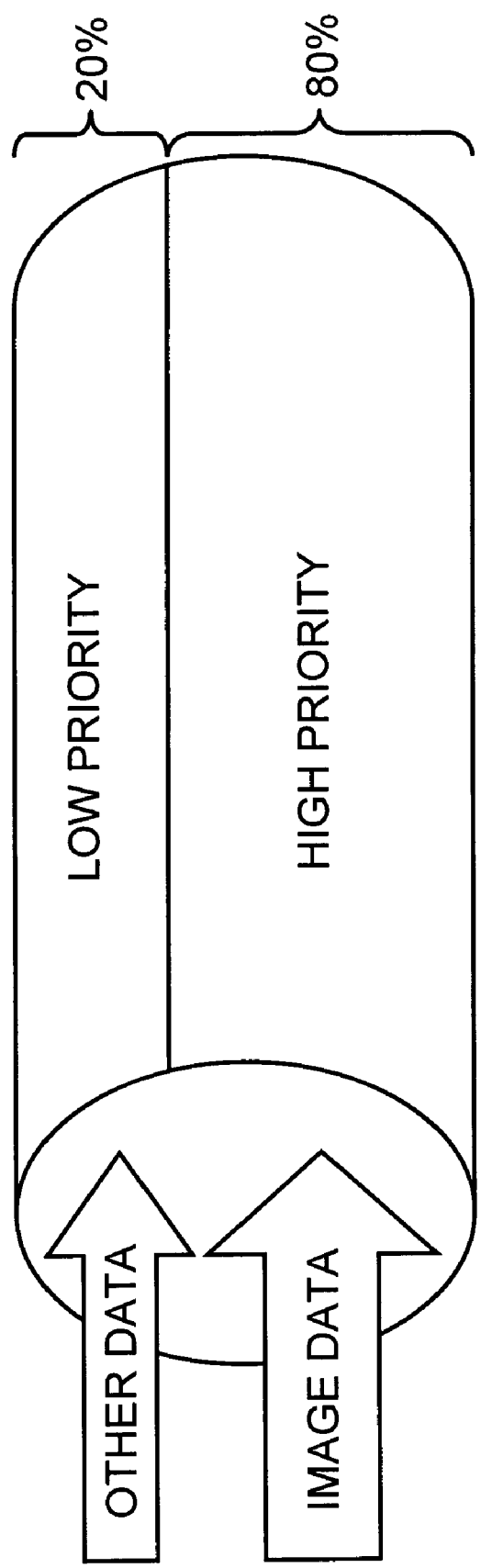
FIG. 9C is a diagram illustrating division of bandwidth according to the first embodiment of the present invention.

The route changer 19 of the entry device makes it possible to appropriately change routing to meet characteristic of user data by grasping the delay conditions (FIG. 2 <S9>). When changing routing, another Policy definition which meets the requirement is read from the route information stored in the route DB storage 11 and automatic change of routing is performed. For example, the above-described Policy of FIG. 4A is changed to the Policy of FIG. 4C. FIG. 9A is a diagram showing an example of a result of delay measurement according to the first embodiment of the present invention. FIG. 9B is a diagram illustrating a route change due to a delay occurrence according to the first embodiment of the present invention. FIG. 9C is a diagram illustrating division of bandwidth according to the first embodiment of the present invention. Suppose that, as shown in FIG. 9A, the delay time of a high-priority packet becomes 30 [s], which is a much longer time as compared with the delay time 1 [s] of a low-priority packet. The route changer 19 updates the definition of the Policy, and the high-priority packets passed through the route of the low-priority packets (refer to FIG. 9B). FIG. 9B shows that the route of the image data of high priority has changed from the route (A→B→C→D) denoted by a broken arrow line to the route (A→E→F→D) denoted by a solid arrow line. In the case of the priority definition of QoS in FIG. 4B, when the route of the image data of high priority has moved to (A→E→F→D), only 20% of the bandwidth is allocated to the image data of high priority. Thus, as shown in FIG. 9C, it is desirable to change the bandwidth for the image data of high priority to 80%. Now, when a delay time in the route (A→B→C→D) becomes a predetermined threshold value or less, the route is returned to the original one, and the bandwidth division for each priority of the route (A→E→F→D) is returned back. For the change of the priority definition of QoS on the basis of the delay time will be described in the below.

In the present embodiment, the route changer 19 of the entry device determines whether or not to update the definition of the Policy on the basis of the comparison of the delay time of a packet having a certain priority and the delay time of a packet having another priority. However, for the sake of simplicity, the route changer 19 may determine whether or not the delay time is greater than a predetermined time. That is, the route changer 19 updates the definition of the Policy if the delay time is greater than the predetermined time, and does not update the definition of the Policy if the delay time is not greater than the predetermined time.

When the delay time reduces to the predetermined time, the Policy is returned back to the original one to change to the high-priority route that was used before the occurrence of the delay. A delay test packet is generated for measuring a delay time on the basis of setting information for the delay test packet generation regardless of the current Policy and the occurrence of a delay.

In the present embodiment, Policy Routing is used for changing a route. However, as described above, a route may be changed by changing cost values of OSPF.

In the network apparatus according to the present embodiment, as described above, it is possible to adapt the routing dynamically to the fluctuating network conditions in order to meet characteristic of user data.

Second Embodiment of the Present Invention

Figure 10A:
Figure 10B:
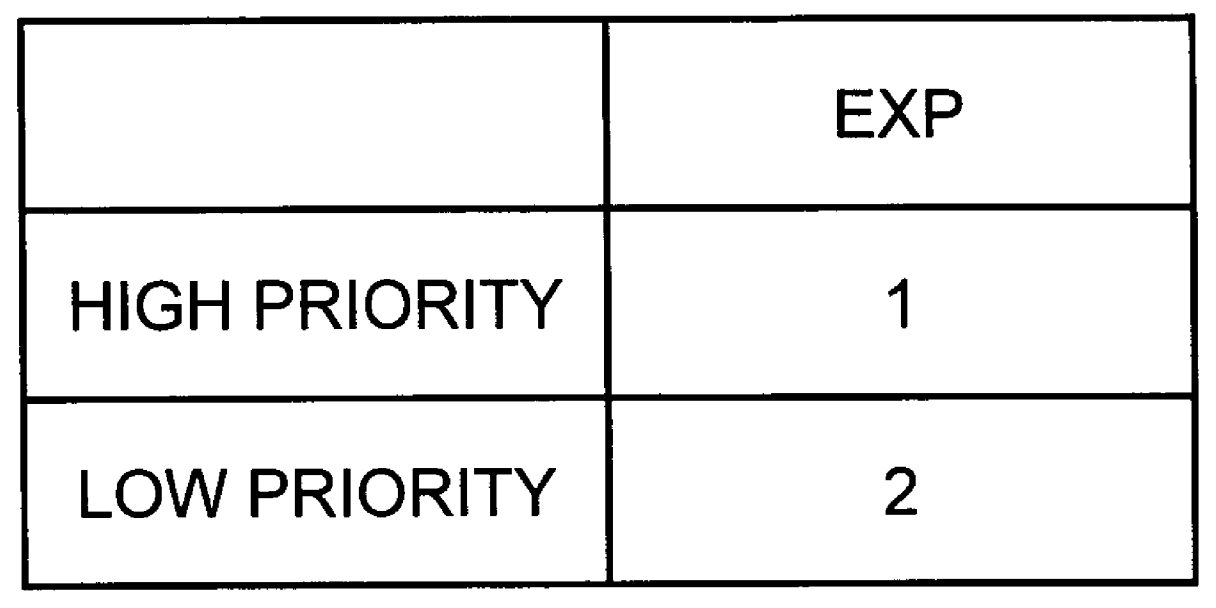

FIGS. 10A and 10B are diagrams illustrating a delay test packet in an MPLS network according to a second embodiment of the present invention. In the first embodiment, a description of the present invention has been given on an IP network using QoS. However, in the present embodiment, a description of the present invention will be given on a network to which MPLS is further applied. That is to say, the present embodiment explains the present invention on an IP network, in which OSPF is used for routing protocol and MPLS QoS is implemented.

Figure 11A:
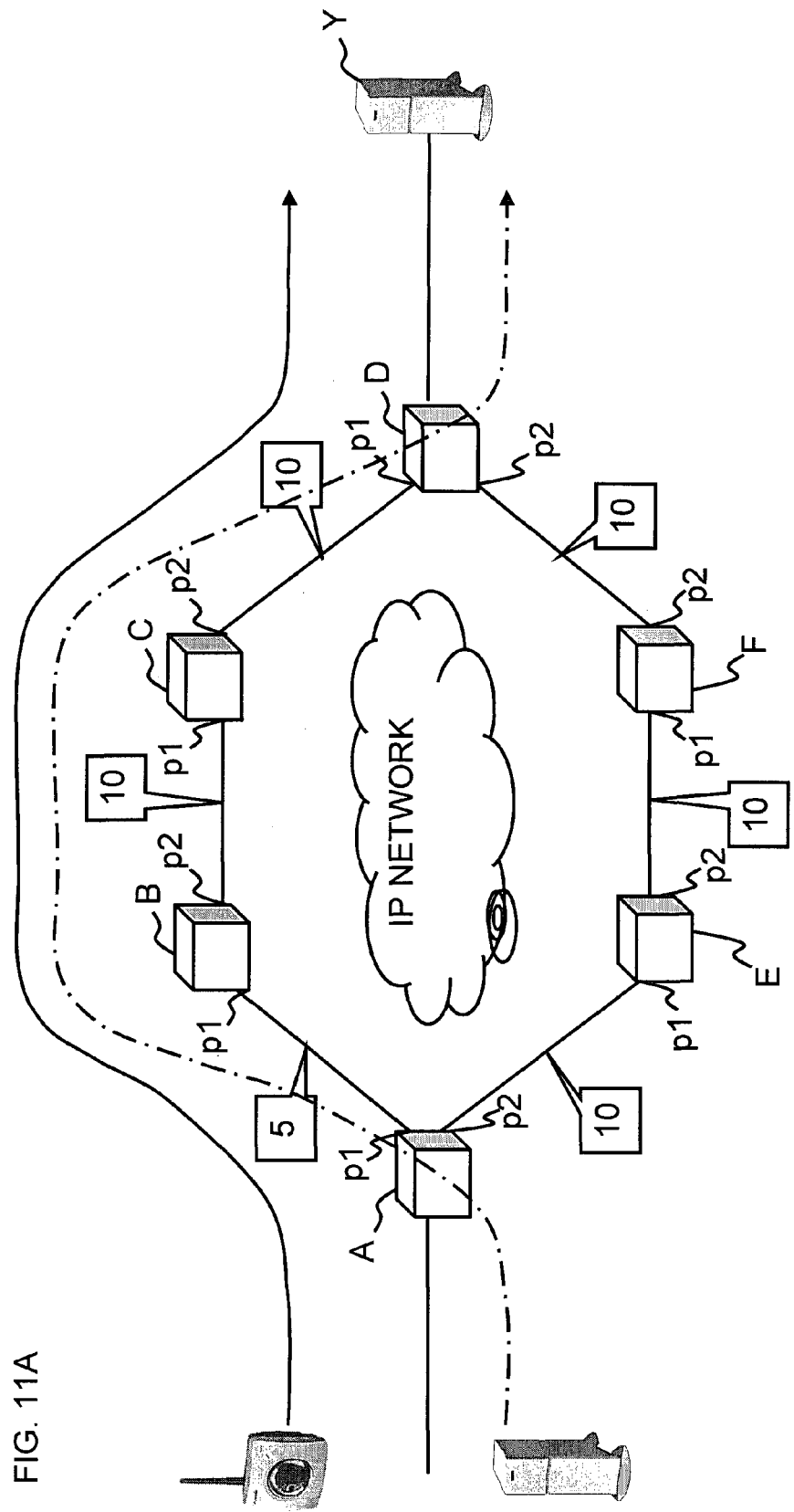
FIGS. 11A and 11B are diagrams illustrating a change of routing on the basis of the delay time in MPLS QoS according to the second embodiment of the present invention.
Figure 11B:
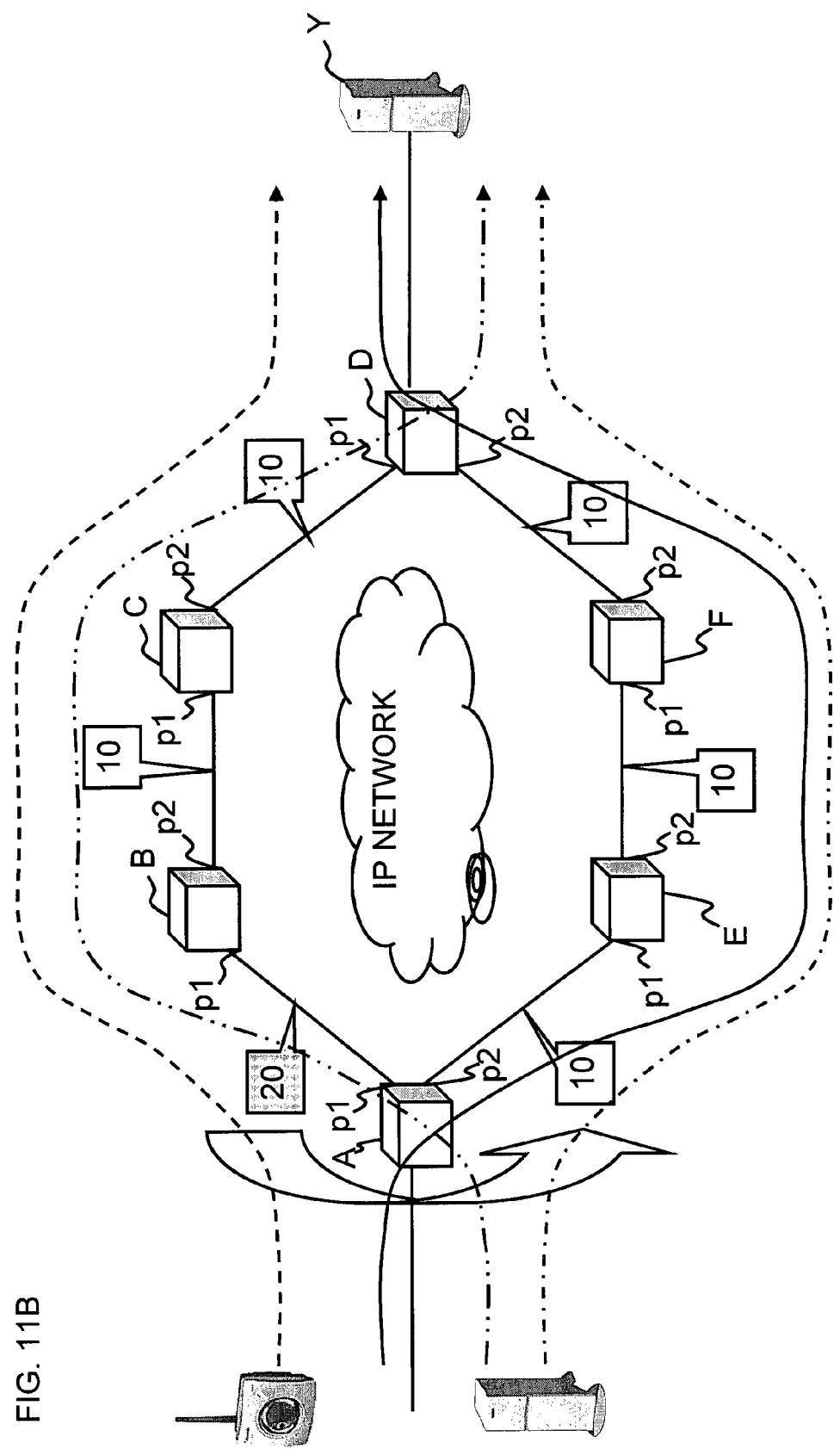

Network apparatuses A, B, C, D, E, and F in the network shown in FIGS. 11A and 11B are label switched routers (LSR). In the same manner as the network apparatuses according to the first embodiment, the label switched router according to the present embodiment includes route DB storage 11 containing a routing table (LFIB: Label Forwarding Information Base) and route information, packet relay 12, test packet generator 13, test packet transmitter 14, reply packet receiver 17, delay calculator 18, route changer 19, test packet receiver 15, and reply packet transmitter 16. The network apparatus A, the entry device, and the network apparatus B, the exit device may be a label edge routers (LER) among the LSRs.

FIGS. 10A and 10B are diagrams illustrating a delay test packet in an MPLS network according to a second embodiment of the present invention. Unlike the first embodiment described above, the priority is not written in the ToS field of IP header in the present embodiment. Instead, the priority is written in the EXP field of the SHIM header shown in FIG. 10A, which is inserted before IP header and which includes the MPLS label. In relaying real-data transmission from the computer X to the computer Y, if a label switched router is provided before the network apparatus A, priority may be already written in the EXP field of the MPLS label. However, if the network apparatus A is a label edge router of MPLS, the test packet generator 13 writes priority into the EXP field. As shown in FIG. 10B, the EXP value "1" is set for the high priority, and "2" is set for the low priority in the present embodiment. In the same manner as the first embodiment described above, in MPLS QoS, a bandwidth can be allocated to each priority level of QoS as shown in FIG. 9C for example.

FIGS. 11A and 11B are diagrams illustrating a change of routing on the basis of the delay time in MPLS QoS according to the second embodiment of the present invention. As shown in FIG. 11A, it is assumed that routing is performed such that both image data of high priority and the other data of low priority take the route (A→B→C→D). The test packet generator 13 of the entry device generates a delay test packet on the basis of setting information for the delay test packet generation. The test packet generator 13 of the entry device generates a delay test packet by inserting an SHIM header having a label indicating a target route and an EXP field in which priority is written before an IP packet. The test packet transmitter 14 of the entry device transmits the generated delay test packet.

The packet relay 12 of the relay device executes Swap, that is, changes the label and performs forwarding (i.e., checking the destination information of the received packet, and transmitting the packet to an appropriate destination). The test packet receiver 15 of the exit device receives the delay test packet. The reply packet transmitter 16 of the exit device writes a label into the SHIM header of the reply-delay test packet and transmits the reply-delay test packet. The label has the same route and the opposite direction with the route written in the label of the delay test packet. The reply-delay test packet is produced by duplicating the delay test packet. The reply packet transmitter 16 changes TF in the IP data section from "1" to "0". The packet relay 12 of the relay device changes the label, and performs forwarding in the opposite direction of the above.

The reply packet receiver 17 of the entry device receives the reply-delay test packet. The delay calculator 18 calculates a delay time on the basis of the transmission time of the delay test packet and the reception time of the reply-delay test packet. When the delay time calculated in the case of transmitting the high-priority delay test packet and the low-priority delay test packet through the route (A→B→C→D→C→B→A) is equal to a predetermined threshold value or more, the route changer 19 aggravates the cost value ("10"→"20") between the network apparatus A and the network apparatus B in OSPF, and thereby Link State information is updated. Furthermore, the routing table of MPLS is updated, and thus the network goes to a state shown in FIG. 11B, that is to say, both the image data of high priority and the other data of low priority take the route (A→E→F→D). The image data of high priority has changed the route from the route before the occurrence of the delay (denoted by a broken arrow line) to the route after the occurrence of the delay (denoted by a solid arrow line). The other data of low priority has changed the route from the route before the occurrence of the delay (denoted by a dashed double-dotted arrow line) to the route after the occurrence of the delay (denoted by a dashed dotted arrow line). This is because MPLS and LFIB are also automatically changed by changing OSPF cost value and the Policy. In the first embodiment, the Policy is updated in accordance with the delay time. In the present embodiment, it is also possible to update the Policy in accordance with the delay time.

Figure 12A:
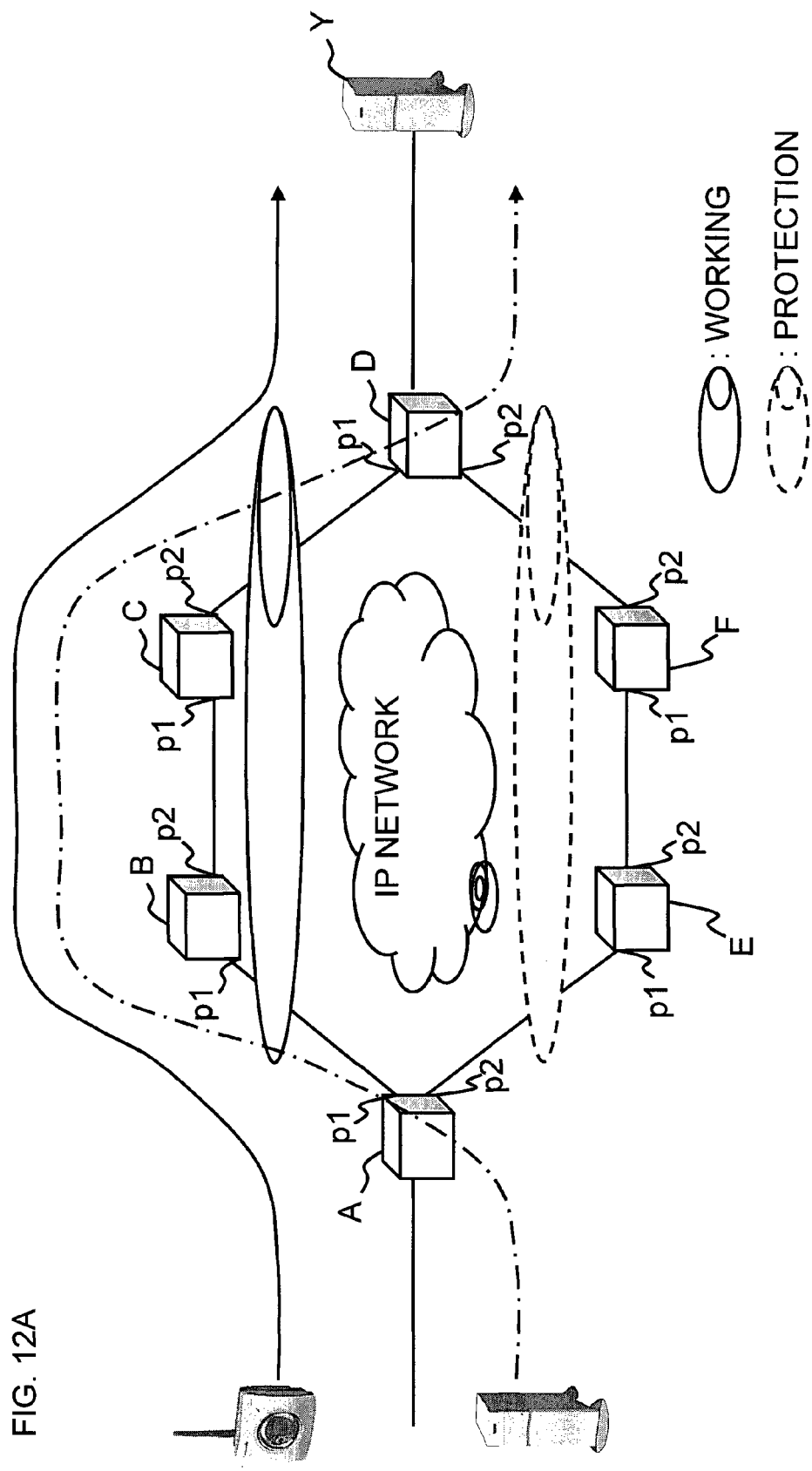
FIGS. 12A and 12B are diagrams illustrating a change of routing on the basis of the delay time in MPLS VPN according to the second embodiment of the present invention.
Figure 12B:
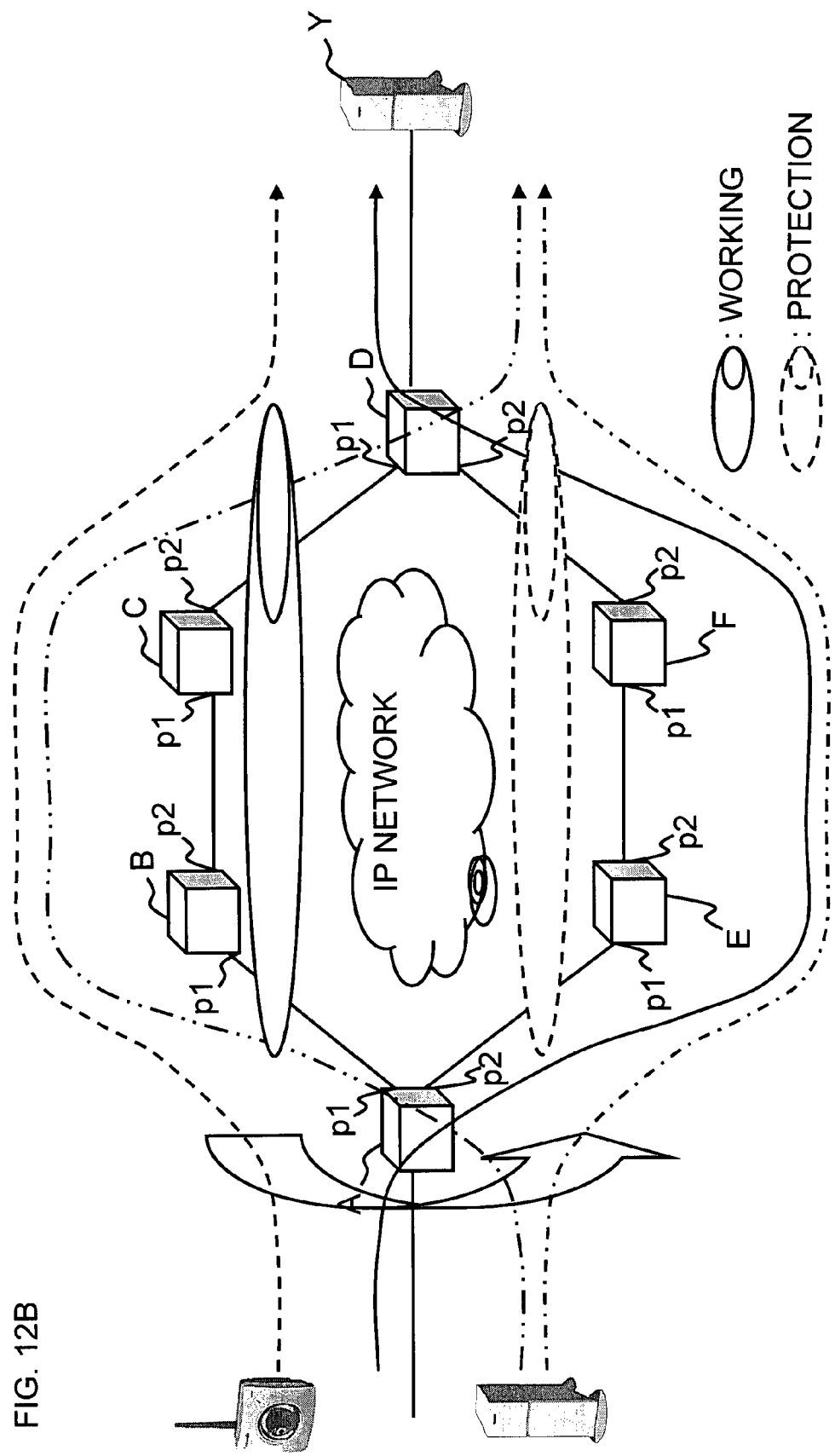

Similarly, it is possible to make the following configuration. FIGS. 12A and 12B are diagrams illustrating a change of routing on the basis of the delay time in MPLS VPN according to the second embodiment of the present invention. A network is constituted by network apparatuses of label switched routers as in the configuration in FIGS. 12A and 12B. The route of the VPN takes a Working route (A→B→C→D) and a Protection route (A→E→F→D) by the definition of MPLS-TE (Traffic Engineering). If the delay time obtained on the basis of a delay test packet or a reply-delay test packet of low-priority or high-priority through the Working route becomes a predetermined value or more, the route is changed from the Working route in FIG. 12A to the Protection route in FIG. 12B.

Third Embodiment of the Present Invention

A third embodiment of the present invention will be described.

Figure 13A:
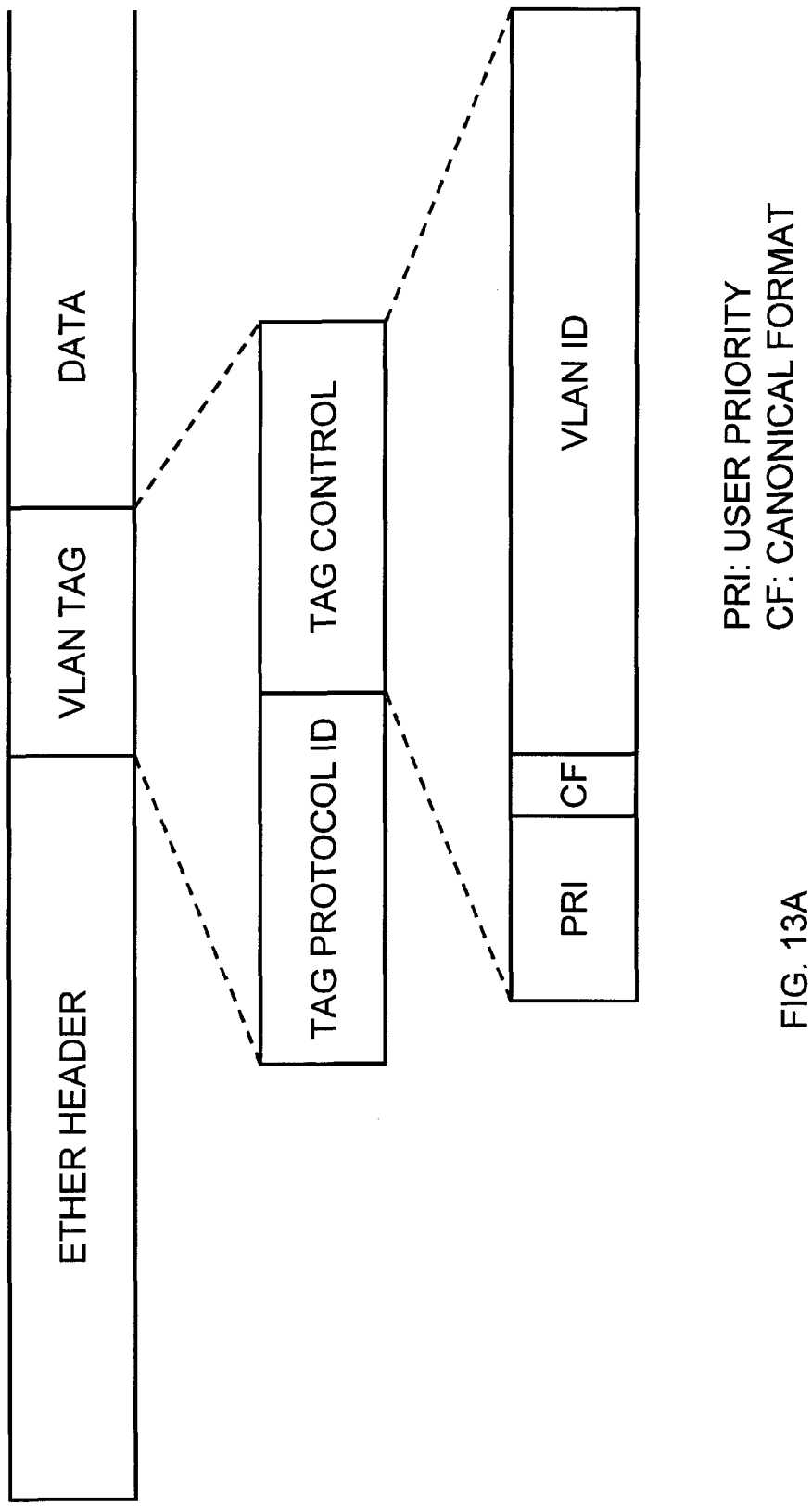
FIGS. 13A and 13B are diagrams illustrating a VLAN-Tag frame format according to a third embodiment of the present invention.
Figure 13B:
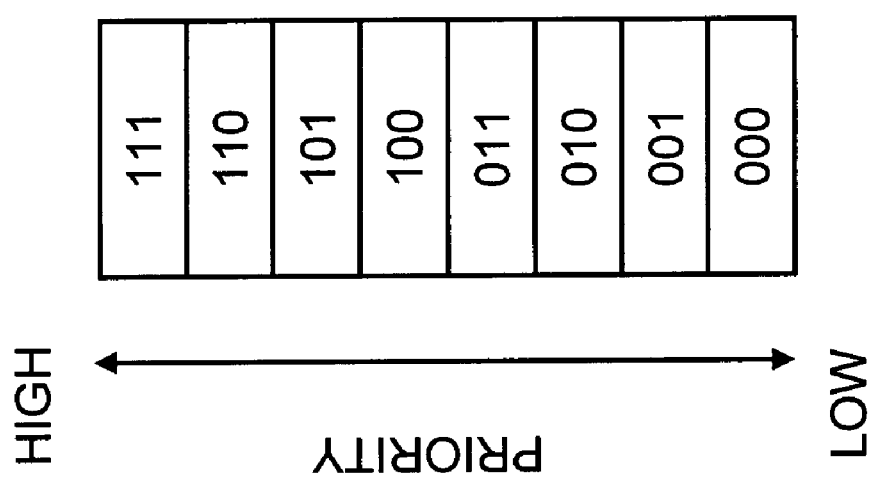

FIGS. 13A and 13B are diagrams illustrating a VLAN-Tag frame format (L2 format) according to a third embodiment of the present invention. The test packet generator 13 of the entry device writes a priority value shown in FIG. 13B into the PRI field of the frame format shown in FIG. 13A in accordance with the priority.

Figure 14A:
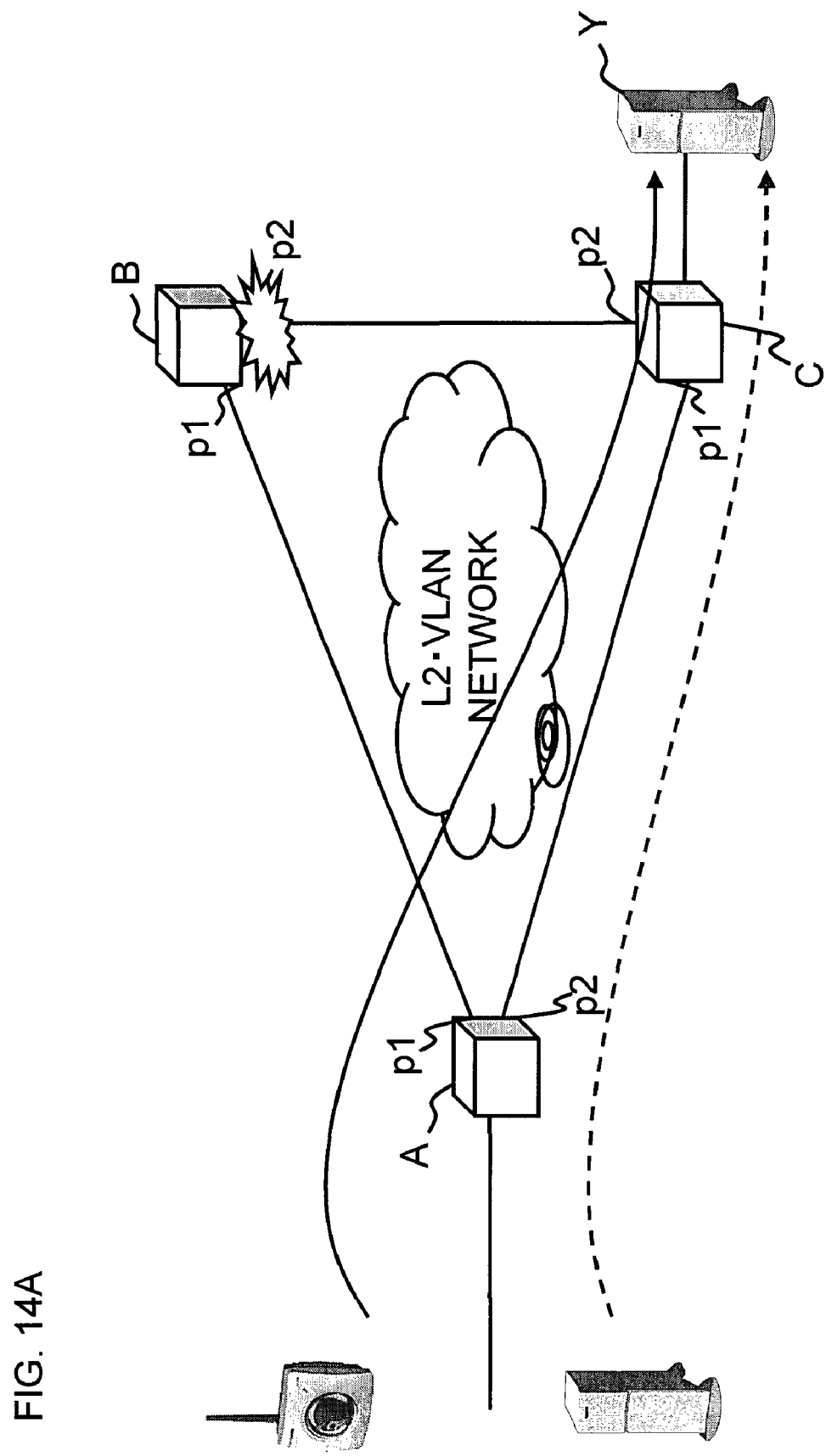
FIG. 14A is a network configuration diagram of network apparatuses (before the occurrence of delay) according to the third embodiment of the present invention.

FIG. 14A is a network configuration diagram of network apparatuses (before the occurrence of delay) according to the third embodiment of the present invention. Network apparatuses A, B, and C in the network shown in FIG. 14A are LAN switches. In the same manner as the network apparatuses according to the first embodiment, the LAN switch according to the present embodiment includes route DB storage 11 containing a routing table (ARP table: Address Resolution Protocol table) and route information, packet relay 12, test packet generator 13, test packet transmitter 14, reply packet receiver 17, delay calculator 18, route changer 19, test packet receiver 15, and reply packet transmitter 16.

FIG. 14B is an example of setting information for the delay test packet generation according to the third embodiment of the present invention. Unlike the first embodiment described above, the test packet generator 13 does not write priority in the ToS field of IP header, but writes priority in the PRI field of the VLAN-Tag frame format, and generates a delay test packet on the basis of setting information for the delay test packet generation as shown in FIG. 14B. The test packet generator 13 writes an identifier of VLAN for the exit device into VLAN ID (identifier), and writes the MAC (Media Access Control) address of the exit device into the Ether header. The test packet transmitter 14 of the entry device transmits the delay test packet.

When a relay device is provided, the delay test packet is transferred in accordance with VLAN ID.

The test packet receiver 15 of the exit device receives the delay test packet. The reply packet transmitter 16 of the exit device duplicates the received delay test packet, writes an identifier of VLAN for the entry device into VLAN ID, and writes the MAC address of the entry device into the Ether header. The reply packet transmitter 16 changes TF in the IP data section from "1" to "0". The reply packet transmitter 16 of the exit device transmits a reply-delay test packet, and the reply packet receiver 17 of the entry device receives the reply-delay test packet through the relay device. The delay calculator 18 of the entry device calculates a delay time on the basis of the transmission time of the delay test packet and the reception time of the reply-delay test packet.

In a L2-VLAN network, in a network using spanning tree protocol, a route (A→C) is used as a real data route on the basis of the route cost as shown in FIG. 14A. However, the delay test packet and the reply-delay test packet also take the route (A→B→C→B→A) through B having a blocking port as shown in FIG. 14B.

FIG. 15A shows a route cost definition of each network apparatus according to the third embodiment of the present invention. The route can be determined by defining "route cost" for each device port by the characteristic of spanning tree protocol in the L2 network. A route with lower "route cost" gets higher priority. Accordingly, since the route cost value defined for the port p2 of the network apparatus A is "10", the route becomes (A→C) as in FIG. 14A.

Figure 15B:
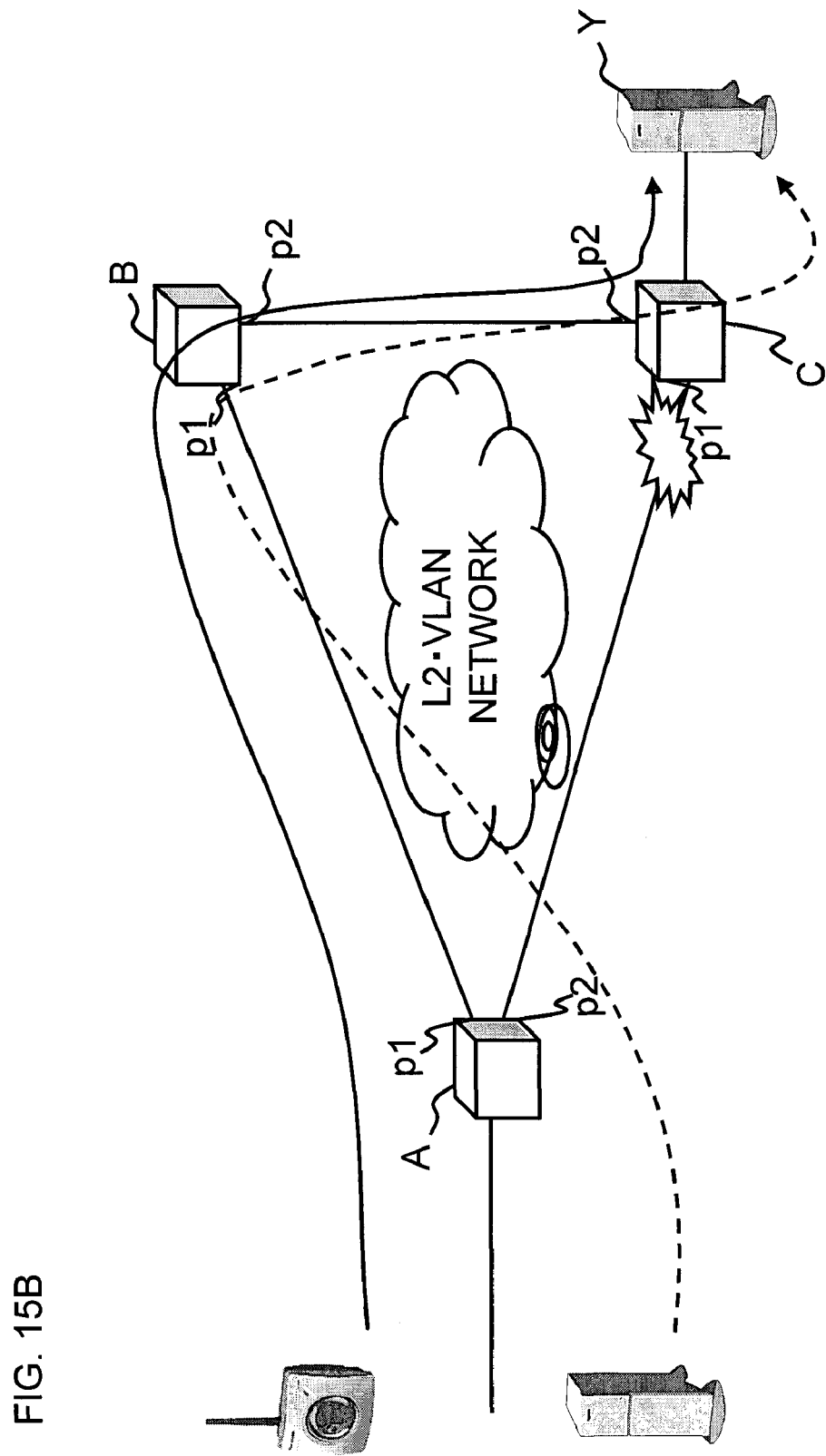
FIG. 15B is a network configuration diagram of network apparatuses (after the occurrence of delay) according to the third embodiment of the present invention.

FIG. 15B is a network configuration diagram of network apparatuses (after the occurrence of delay) according to the third embodiment of the present invention. For example, when a delay is found in the route (A→C) as a result of the delay measurement, the route changer 19 automatically changes the route cost value of the port p2 of the network apparatus A from "10" to "15". Thus, as shown in FIG. 15B, the blocking port is changed from "p2" to "p1" of the network apparatus C, and the route becomes (A→B→C).

Other Embodiments

Update of QoS Definition According to Route Change Due to Delay

In order to update the routing in the above-described individual embodiments, Policy Routing, OSPF cost values, VPN paths, and VLAN cost values have been updated. Furthermore, the QoS definition can also be updated. By doing so, the optimum QoS definition in a network condition without a route change before the occurrence of a delay is replaced with another QoS definition in a network condition after the occurrence of a delay, and thus it is possible to perform the optimum QoS control in accordance with the routing.

FIGS. 16A, 16B, 16C, and 16D are diagrams illustrating the update of the QoS priority definition on the basis of the delay time according to another embodiment of the present invention. Suppose that, in the network configuration of FIG. 1, the QoS definition is FIG. 16A. When a delay occurs in the route (A→B→C→D), and the route for image data of high priority is changed to the route (A→E→F→D), since the bandwidth for image data of high priority is not allocated to the route (A→E→F→D) in the state of FIG. 16A as it is, image data of high priority cannot be forwarded from the computer X. Thus, the bandwidth of the route (A→E→F→D) for other data of low priority is divided into two, and the bandwidth for image data of high priority in the route is ensured to be set to "50%", while the QoS priority definition of the route (A→B→C→D) for image data of high priority is kept as it is (FIG. 16B). By this means, image data of high priority is transmitted from the computer X to the computer Y through the route (A→E→F→D). On the other hand, if a delay occurs in the route (A→E→F→D), the bandwidth for the other data of low priority in the route (A→B→C D) is ensured to be set to "20%" (FIG. 16C). Furthermore, when the route for the other data of low priority is changed to the route (A→B→C→D), and the QoS priority definition is made for the bandwidth for the other data of low priority is ensured to be set to "20%", if the delay time is not improved to a predetermined level, and if a delay has not occurred with image data of high priority, the bandwidth for the other data of low priority is enlarged to "50%" as shown in FIG. 16D. Next, a specific description will be given on the processing of a network apparatus in the case of changing from FIG. 16C to FIG. 16D. In order to cope with a delay occurring in the route (A →E→F→D), the user presets the QoS priority definition for the route (A→B →C→D), for example, FIG. 16C for DELAY-LEVEL-1 (the delay time is exceeding a first threshold value) and FIG. 16D for DELAY-LEVEL-2 (the delay time is exceeding a second threshold value). Here, the degree of a delay is greater in the case of the DELAY-LEVEL-2 (the second threshold value is 20 [second] for example) than in the case of DELAY-LEVEL-1 (the first threshold value is 10 [second] for example). Even if a delay which is greater than the second threshold value occurs in the route (A→E→F→D), the route changer 19 uses the QoS priority definition of the DELAY-LEVEL-1 for the time being. When the delay time after using the QoS priority definition of the DELAY-LEVEL-1 is still greater than the second threshold value, and if a delay (both DELAY-LEVEL-1 and DELAY-LEVEL-2) has not occurred on the route (A→B→C→D) for the image data of high priority, the QoS priority definition of the case of the DELAY-LEVEL-2 is used. However, when a change is made to the QoS priority definition of the DELAY-LEVEL-1 or the DELAY-LEVEL-2 for the other data of low priority, if a delay occurs in the image data of high priority, the route and the QoS priority definition for the other data of low priority is returned to the previous state. In short, delay conditions are classified into a plurality of levels, and the QoS priority definition is preset for each priority and for each of the plurality of levels of the delay conditions. When a delay occurs, the QoS priority definition corresponding to the delay condition is not used immediately, but if there are a certain number of delay conditions from the present delay condition up to that delay condition, the next QoS priority definition to the present delay condition is used first. After checking the fluctuation in the delay condition, QoS priority definition is further changed if needed. Thus, the QoS priority definition to be used is changed in accordance with the fluctuation of the delay condition. If a delay occurs or the delay condition deteriorates for data of other priority (preferably, of higher priority) due to the change of the QoS priority definition, the QoS priority definition of the priority is returned back. By doing so, it is possible to maintain the network service quality better suited in the range not giving bad effects on the data of other priorities.

In this manner, it is possible to build a stable-quality network by changing the bandwidth ratio for each priority in accordance with the degree of the delay.

Route Change at Delay Occurrence Time

The route change based on a delay time is desirable not to be on the basis of only the delay time of the route to be changed, but to be also determined on the basis of the delay time after the route change. By doing so, it is possible to prevent the situation that a longer delay occurs in the route after the change. For example, in FIG. 1, 80 [%] of the bandwidth is allocated to data of high priority in the route (A→B→C→D), and 20 [%] of the bandwidth is allocated to data of high priority in the route (A→E→F→D). Delay measurement is carried out with a delay test packet of high priority on the route (A→B→C→D), and delay measurement is carried out with a delay test packet of high priority on the route (A→E→F→D). The route of the high-priority packet should not be changed to the route (A→E→F→D) only because the delay time of the route (A→B→C→D) is greater than the first threshold value. The route of the high-priority packet should be changed to the route (A→E→F→D) when the delay time of the route (A→E→F→D) is also not greater than the second threshold value. When the delay time of the route (A→E→F→D) is greater than the second threshold value, the route of the high-priority packet should not be changed to the route (A→E→F→D), and the route (A→B→C→D) should be maintained.

Also, even when the route after the delay is currently the route of the other priority packet, a delay test packet is sent to measure a delay time. It is more desirable to measure a delay time by setting the route and the QoS definition after the delay only at delay measuring time period. However, it is desirable to measure a delay time when the network usage rate of the route affected by the route change is low.

Change of Classify/Marking Based on Delay Time

In each of the above-described embodiments, the descriptions have been given on a change from OSPF to Policy Routing, a change from Policy Routing to OSPF, a change of a cost value in OSPF, a change in Policy Routing, a change of VPN path, a change of a VLAN cost value, etc. based on the delay time. Here, a description will be given on a change of Classify/Marking based on the delay time. When processing a packet in general, a network apparatus classifies packets by a destination address (IP address) of a packet, an application identification number (port number), a reception port, a packet length, an MPLS label, a ToS, etc. The classified packets are grouped, and then priorities are given. Then, the classified and marked packets are queued to be transferred by the scheduler to the route according to the priorities. Accordingly, by changing the criteria of classification (class map), the route of a packet is changed when the priority of the packet becomes different from the criteria of classification before the change of the criteria, and thus it becomes possible to change the routing.

Figure 17A:
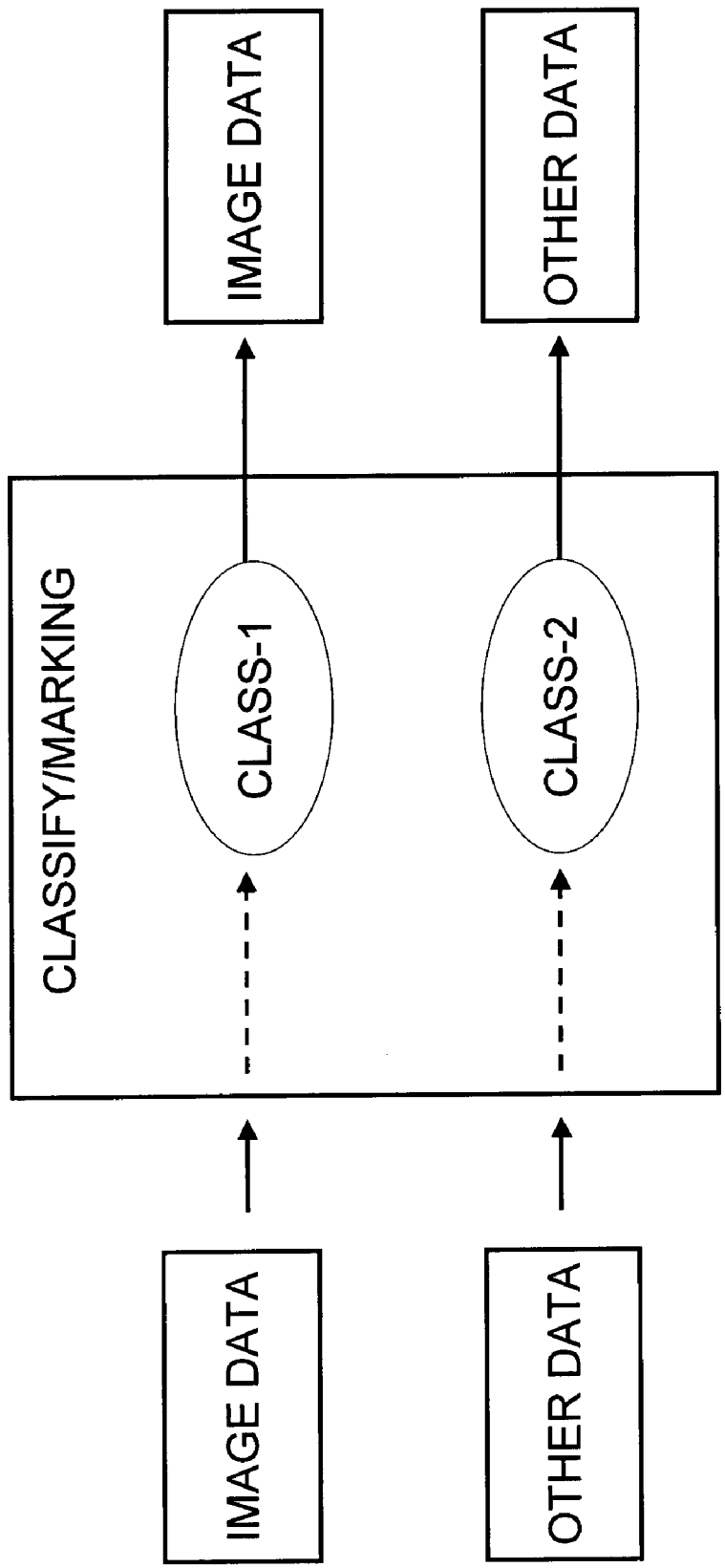
FIGS. 17A and 17B are diagrams illustrating a change in Classify/Marking on the basis of the delay time according to another embodiment of the present invention.
Figure 17B:
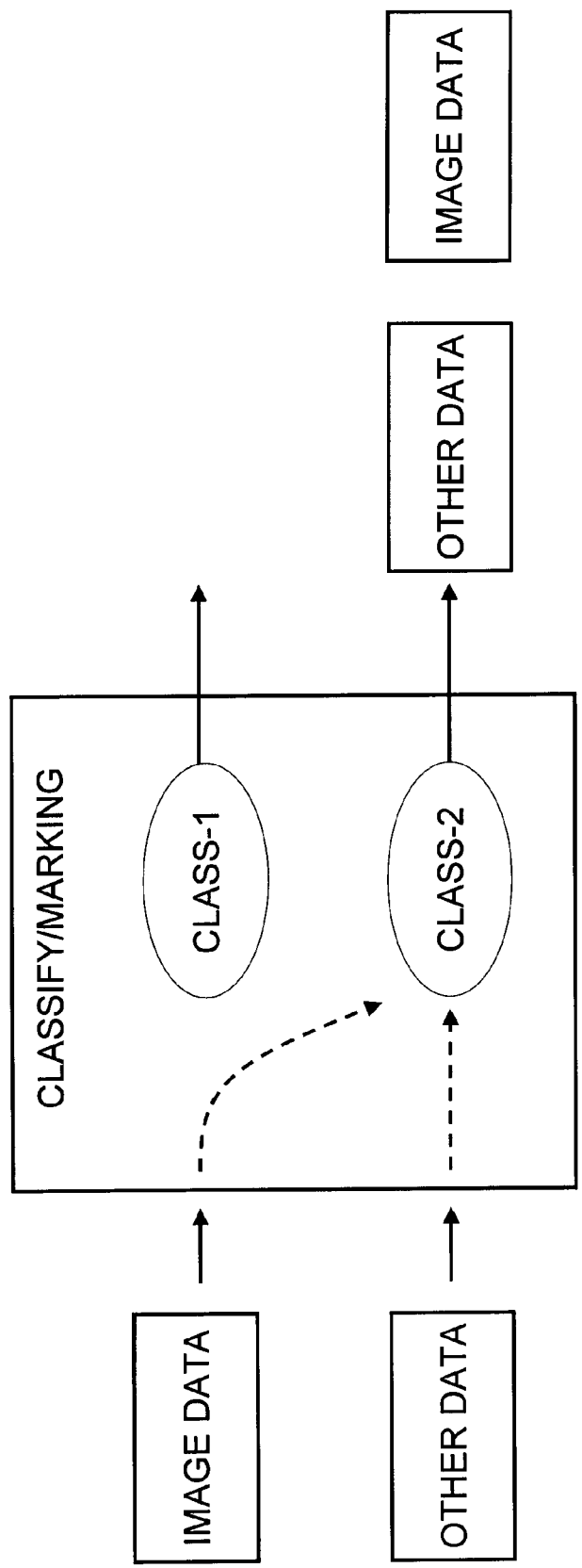

FIGS. 17A and 17B are diagrams illustrating a change in Classify/Marking on the basis of the delay time according to another embodiment of the present invention. When packets are classified by a port number, etc., as shown in FIG. 17A, image data is currently classified into CLASS-1 to go through the route (A →B→C→D) in FIG. 1, and the other data is classified into CLASS-2 to go through the route (A→E→F→D) in FIG. 1. Here, if the class map is changed, as shown in FIG. 17B, image data is also classified into CLASS-2 to go through the route (A→E→F→D) in FIG. 1. In this manner, the related portion of the class map is changed on the basis of the delay time. However, it is not necessary to classify all the packets classified in CLASS-1 in FIG. 17A into CLASS-2, and thus the class map is changed to partially classify the packets.

In order to have such a configuration, it is necessary to set the class map of after the change beforehand, according to the priority and the route corresponding to the delay condition. FIGS. 18A and 18B are diagrams explaining route-change setting information according to another embodiment of the present invention. For example, as shown in FIG. 18B, class maps for individual combination of a priority and a delay condition for a delay test packet are registered in a priority-and-delay-condition table. Assuming that the current delay condition is DELAY-LEVEL-0 (the delay time is not exceeding the first threshold value) and the packet is of high priority, the network is applied with CLASS-MAP-1. Here, delay conditions are classified by a first threshold value (for example, 10 seconds) and a second threshold value (for example, 20 seconds). However, the number of delay threshold value is arbitrary, and the value can be set for each priority. As already described in DELAY-LEVEL-0, if a class map is registered for a packet of low priority in DELAY-LEVEL-1, the class map can be applied over the class map for a packet of high priority in DELAY-LEVEL-0. That is to say, if a plurality of items in a priority-and-delay-condition table are available, one item is selected on the basis of the priorities among the items, and the class map related to the item is applied. It is possible to define a standard class map, and to record the difference information from the standard class map in each item of the priority-and-delay-condition table. A description has been given on a change in a class map. However, as shown in FIG. 18A, a change of Policy Routing can be carried out using this priority-and-delay-condition table. Similarly, the cost values of OSPF, VPN paths, etc., may be recorded linked to the priority-and-delay-condition table, and thereby making it possible to change a route on the basis of the delay time (for example, linking a certain item to the Policy in FIG. 4A, and another item to the Policy in FIG. 4C). Also, a plurality of kinds of information can be linked to the priority-and-delay-condition table. A certain item can be linked to Policy Routing, and another item can be linked to the cost value of OSPF. The route DB storage 11 holds the priority-and-delay-condition table. Furthermore, it is desirable to link the QoS definition described above to each item together with a class map, etc.

As described above, the present invention is a general technique that can be applied to a network accepting various conventional protocols accompanied by a route change on a current IP network.

Also, the present invention has been grasped as a network system so far. However, for those skilled in the art can grasp the present invention as a method of measuring a network delay time, a method of changing a network route, and a network apparatus.

Each device according to the above-described embodiments can be carried out not only as hardware but also as computer software. For example, programs causing a computer to execute the packet relay 12, the test packet generator 13, the test packet transmitter 14, the reply packet receiver 17, the delay calculator 18, the route changer 19, the test packet receiver 15, and the reply packet transmitter 16 shown in FIG. 2 are created, and the programs are read in a memory of the computer and are executed, thereby realizing the network apparatus.

Figure 19:
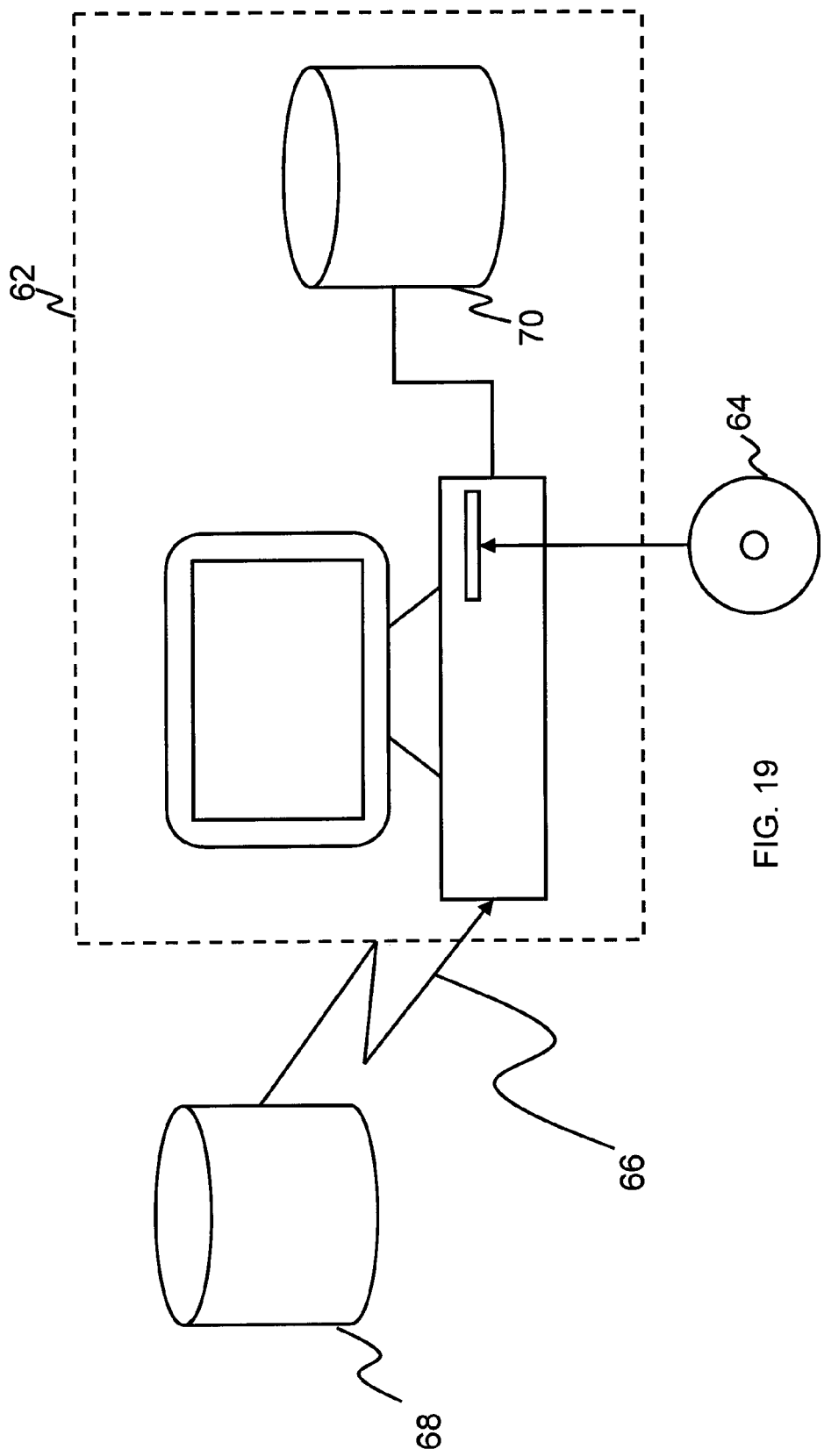
FIG. 19 is a diagram showing an example of a computer environment.

As shown in FIG. 19, the program that realizes the network apparatus according to the embodiments of the present invention may be those stored on not only a portable recording medium 64, such as a CD-ROM, a CD-RW, a DVD-R, a DVD-RAM, a DVD-RW, and a flexible disk, but also another storage device 68 provided at the end of a communication line 66, a storage device or a recording medium 70, such as a hard disk or a RAM of a computer system 62. At the time of execution of the programs, the programs are loaded, and executed on a main memory.

It should be noted that each element of the network apparatus according to the present invention can be a single component and also can be a set of components. Furthermore, it should also be noted that a plurality of elements of the network apparatus according to the present invention can be a single component. Especially, in case that the network apparatus according to the present invention is embodied as a piece of software of a computer, a CPU (central processing unit) of the computer substantially serves as many elements of the network apparatus in accordance with the program for causing the computer to execute functions of the elements.

The present invention has been described by each of the embodiments described above. However, the technical scope of the present invention is not limited to the range of the descriptions of the embodiments. Various changes and improvements can be made to each of those embodiments. An embodiment which has been subjected to such a change or improvement is also included in the technical scope of the present invention. This is apparent from the scope of claims and specification.

What is claimed is:

1. A network system for measuring a delay time in transferring a test packet, comprising: a test packet transmitter for transmitting the test packet including priority information indicating priority of the test packet, and recording a transmission time of transmitting the test packet; a test packet receiver for receiving the test packet transmitted from the test packet transmitter; a reply packet transmitter for transmitting a reply packet including the priority information included in the test packet received by the test packet receiver; a reply packet receiver for receiving the reply packet transmitted from the reply packet transmitter, and recording a reception time of receiving the reply packet; and a delay calculator for calculating the delay time on the basis of the transmission time and the reception time.

2. The network system of claim 1, further comprising:
a route DB storage for storing information including a route of transfer corresponding to the priority information, wherein the test packet transmitter transmits the test packet via said route of transfer corresponding to the priority information; and
a route changer for changing the route of transfer corresponding to the priority information on the basis of the delay time.

3. The network system of claim 2, wherein
said network system is an MPLS network system, and
said test packet includes the priority information in an Exp field of an MPLS header.

4. The network system of claim 3, wherein
said priority information in the Exp field of the MPLS header is changed on the basis of the delay time.

5. The network system of claim 3, wherein
a VPN is established between the test packet transmitter and the test packet receiver and between the reply packet transmitter and the reply packet receiver, and
said route changer changes the route of transfer corresponding to the priority information on the basis of the delay time.

6. The network system of claim 1, wherein
said test packet includes
a flag having a value indicating the test packet,
a source address indicating the entry device, and
a destination address indicating the exit device, and
said reply packet is derived from the test packet by
rewriting the flag with a value indicating the reply packet, and
switching the destination address with the source address.

7. The network system of claim 1, wherein
said network system is an L2-VLAN network system, and
said test packet includes the priority information in a PRI field of a VLAN-Tag.

8. The network system of claim 7, wherein
said priority information in the PRI field of the VLAN-Tag is changed on the basis of the delay time.

9. A network apparatus for measuring a delay time in transferring a first test packet, comprising:
a route DB storage for storing information including a route of transfer corresponding to first priority information indicating priority of the first test packet;
a test packet transmitter for
transmitting the first test packet including the first priority information via the route of transfer corresponding to the first priority information, and
recording a transmission time of transmitting the first test packet;
a reply packet receiver for
receiving a first reply packet transmitted for replying to the first test packet, and
recording a reception time of receiving the first reply packet;
a delay calculator for calculating the delay time on the basis of the transmission time and the reception time; and
a route changer for changing the route of transfer corresponding to the first priority information on the basis of the delay time.

10. The network apparatus of claim 9, said network apparatus communicating with an entry device transmitting a second test packet, further comprising: a test packet receiver for receiving the second test packet including second priority information indicating priority of the second test packet, a flag having a value indicating the second test packet, a source address indicating the entry device, and a destination address indicating the network apparatus; and a reply packet transmitter for transmitting a second reply packet including the second priority information and derived from the second test packet by rewriting the flag with a value indicating the second reply packet, and switching the destination address with the source address.

11. A network apparatus for measuring a delay time in transferring a test packet, said network apparatus being capable of communicating with an entry device transmitting the test packet, said network apparatus comprising:
a test packet receiver for receiving the test packet including priority information indicating priority of the test packet including
a flag having a value indicating the test packet,
a source address indicating the entry device, and
a destination address indicating the network apparatus; and
a reply packet transmitter for transmitting a reply packet including the priority information, and
derived from the test packet by
rewriting the flag with a value indicating the reply packet, and
switching the destination address with the source address.

12. A route change method executed by a network apparatus measuring a delay time in transferring a test packet, said network apparatus including a route DB storage for storing information including a route of transfer corresponding to priority information indicating priority of the test packet, said route change method comprising the steps of
transmitting the test packet including the priority information via the route of transfer corresponding to the priority information;
recording a transmission time of transmitting the test packet;
receiving a reply packet transmitted for replying to the test packet;
recording a reception time of receiving the reply packet;
calculating the delay time on the basis of the transmission time and the reception time; and
changing the route of transfer corresponding to the priority information on the basis of the delay time.

13. A program storage medium readable by a computer, said program storage medium storing a program of instructions for the computer to execute a route change method based on a delay time in transferring a test packet, said computer including a storage for storing information including a route of transfer corresponding to priority information indicating priority of the test packet, said route change method comprising the steps of:
transmitting the test packet including the priority information via the route of transfer corresponding to the priority information;
recording a transmission time of transmitting the test packet;
receiving a reply packet transmitted for replying to the test packet;
recording a reception time of receiving the reply packet;
calculating the delay time on the basis of the transmission time and the reception time; and
changing the route of transfer corresponding to the priority information on the basis of the delay time.

* * * * *